(12) United States Patent
Imaki et al.

(10) Patent No.: US 9,618,530 B2
(45) Date of Patent: Apr. 11, 2017

(54) LASER RADAR DEVICE

(71) Applicant: Mitsubishi Electric Corporation, Tokyo (JP)

(72) Inventors: Masaharu Imaki, Tokyo (JP); Nobuki Kotake, Tokyo (JP); Shumpei Kameyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 234 days.

(21) Appl. No.: 14/427,121

(22) PCT Filed: Apr. 5, 2013

(86) PCT No.: PCT/JP2013/060482
§ 371 (c)(1),
(2) Date: Mar. 10, 2015

(87) PCT Pub. No.: WO2014/045627
PCT Pub. Date: Mar. 27, 2014

(65) Prior Publication Data
US 2015/0241461 A1 Aug. 27, 2015

(30) Foreign Application Priority Data
Sep. 24, 2012 (JP) .................. 2012-209639

(51) Int. Cl.
*G01P 3/36* (2006.01)
*G01P 5/26* (2006.01)
(Continued)

(52) U.S. Cl.
CPC .............. *G01P 5/26* (2013.01); *G01S 7/483* (2013.01); *G01S 7/4813* (2013.01);
(Continued)

(58) Field of Classification Search
CPC ........ G01S 17/95; G01S 17/107; G01S 17/58; G01S 7/483; G01P 5/26
(Continued)

(56) References Cited

U.S. PATENT DOCUMENTS 5,847,817 A * 12/1998 Zediker ............... G01S 7/493
356/28.5
6,580,497 B1 6/2003 Asaka et al.
(Continued)

FOREIGN PATENT DOCUMENTS

JP S63-001940 A 1/1988
JP S63-003230 A 1/1988
(Continued)

OTHER PUBLICATIONS

The extended European search report issued by the European Patent Office on Apr. 28, 2016, which corresponds to European Patent Application No. 13838342.7-1812 and is related to U.S. Appl. No. 14/427,121.
(Continued)

*Primary Examiner* — Mark Hellner
(74) *Attorney, Agent, or Firm* — Studebaker & Brackett PC

(57) ABSTRACT

There is provided a coherence length measurement device (10) that calculates a coherence length $L_c$ based on a spectrum v calculated by an FFT device (9) and performs, in case where the coherence length $L_c$ is shorter than an FFT gate width $G_w$, a setting change to shorten the FFT gate width $G_w$ and a pulse width $P_w$, and the FFT device (9) performs frequency analysis on a received signal outputted from an A/D converter (8) by a unit of an FFT gate following the setting change to calculate the spectrum v of the received signal.

7 Claims, 10 Drawing Sheets

(51) Int. Cl.
*G01S 17/95* (2006.01)
*G01S 17/10* (2006.01)
*G01S 17/58* (2006.01)
*G01S 7/483* (2006.01)
*G01S 7/481* (2006.01)

(52) U.S. Cl.
CPC ............ *G01S 17/107* (2013.01); *G01S 17/58* (2013.01); *G01S 17/95* (2013.01)

(58) Field of Classification Search
USPC .......................................................... 356/28
See application file for complete search history.

(56) References Cited

U.S. PATENT DOCUMENTS

| | | | | |
|---|---|---|---|---|
| 7,365,675 | B2 * | 4/2008 | Pearlman | ................ G01S 7/003 342/115 |
| 2005/0146706 | A1 | 7/2005 | Kameyama et al. | |
| 2006/0011840 | A1 * | 1/2006 | Bryce | .................. G01N 21/314 250/338.5 |
| 2007/0058156 | A1 | 3/2007 | Ando et al. | |
| 2011/0285984 | A1 * | 11/2011 | Christian | .................. G01P 5/26 356/28.5 |

FOREIGN PATENT DOCUMENTS

| | | |
|---|---|---|
| JP | 2000-338246 A | 12/2000 |
| JP | 2009-162678 A | 7/2009 |
| WO | 2006/030502 A1 | 3/2006 |

OTHER PUBLICATIONS

Rod Frehlich; "Coherent Doppler lidar signal covariance including wind shear and wind turbulence"; Applied Optics; Sep. 20, 1994; pp. 6472-6481; vol. 33; No. 27; US.

International Search Report; PCT/JP2013/060482; Jul. 16, 2013.

* cited by examiner

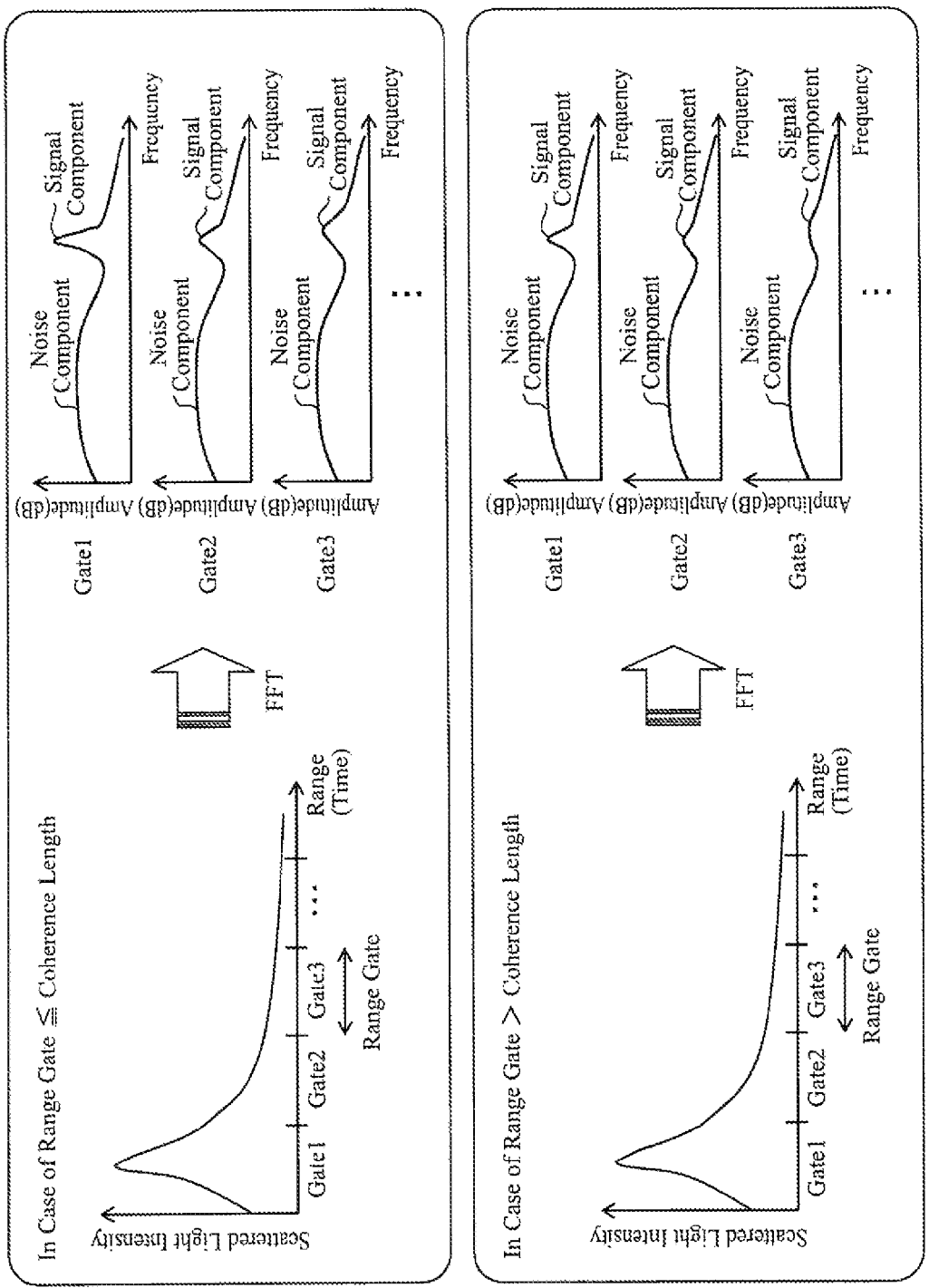

LASER RADAR DEVICE

TECHNICAL FIELD

The present invention relates to a coherent lidar device and a laser radar device capable of improving heterodyne efficiency by setting the width of a range gate to an appropriate value according to a coherence length to be changed due to a factor such as fluctuation in environmental conditions.

BACKGROUND ART

A typical laser radar device as disclosed in the following Patent Document 1 radiates laser light that is pulsed light in the atmosphere, and then to receive laser light (scattered light) that is reflected by an aerosol existing in the atmosphere to be returned.

The laser radar device performs heterodyne detection on the scattered light and transmitted pulsed light to find a Doppler shift that occurs with the movement of the aerosol, and the wind speed in a laser irradiation direction (moving speed of the aerosol) is measured based on the Doppler shift.

FIG. 9 is a configuration diagram depicting a typical laser radar device. The laser radar device includes the following components:

(1) a light source 101 that oscillates continuous wave light (laser light) with a single frequency, referred to as local light;

(2) a light distributor 102 that distributes the continuous wave light oscillated from the light source 101 into two beams, and outputs one continuous wave light to a pulse modulator 103 and outputs the other continuous wave light to an optical coupler 106;

(3) the pulse modulator 103 that gives a predetermined frequency shift to the continuous wave light outputted from the light distributor 102, and also performs pulse modulation on the continuous wave light whose frequency has been shifted and outputs the pulsed light to an optical circulator 104;

(4) the optical circulator 104 that outputs the pulsed light outputted from the pulse modulator 103 to an optical antenna 105, and outputs scattered light received at the optical antenna 105 to the optical coupler 106;

(5) the optical antenna 105 that radiates the pulsed light outputted from the optical circulator 104 in the atmosphere, and then receives the scattered light (pulsed light) that is reflected by the aerosol existing in the atmosphere to be returned; and (6) the optical coupler 106 that multiplexes the continuous wave light outputted from the light distributor 102 with the scattered light outputted from the optical circulator 104, and outputs an optical signal of the multiplexed light to a light receiver 107;

(7) the light receiver 107 that performs heterodyne detection on the optical signal outputted from the optical coupler 106 to convert the optical signal into an electrical signal, and outputs the electrical signal to an analog/digital (A/D) converter 108;

(8) the A/D converter 108 that converts the electrical signal outputted from the light receiver 107 from an analog signal to a digital signal;

(9) a fast Fourier transform (FFT) device 109 that performs frequency analysis on the digital signal outputted from the A/D converter 108 by a unit of an FFT gate (range gate) with a fixed width to calculate the spectrum of the digital signal;

(10) a frequency shift analysis device 110 that calculates an amount of frequency shift that occurs with the movement of the aerosol based on the spectrum calculated by the FFT device 109; and

(11) a wind speed conversion device 111 that converts a wind speed (moving speed of the aerosol) in a laser irradiation direction from the frequency shift amount calculated by the frequency shift analysis device 110.

As described above, the laser radar device is configured such that the FFT device 109 performs frequency analysis on the digital signal outputted from the A/D converter 108 by the FFT gate unit with the fixed width to calculate the spectrum of the digital signal, while in order to enhance an SNR (Signal to Noise ratio), it is necessary that a longer width of the FFT gate be set.

However, since a coherence length changes due to a factor such as fluctuation in environmental conditions, the coherence length is shorter than the width of the FFT gate in some cases.

Now, FIGS. 10(a) and 10(b) are explanatory diagrams for illustrating heterodyne efficiencies in case of the coherence length longer than the width of the FFT gate (range gate) and in case of the coherence length shorter than the width thereof.

FIG. 10(a) depicts a case of the coherence length longer than the width of the FFT gate, where the amplitude of signal components is sufficiently larger as compared to the amplitude of noise components, and the heterodyne efficiency is thus higher.

FIG. 10(b) depicts a case of the coherence length shorter than the width of the FFT date, where the amplitude of signal components is not sufficiently larger as compared to the amplitude of noise components, and the heterodyne efficiency is thus lower.

CITATION LIST

Patent Document

Patent Document 1: JP-A-2009-162678 (paragraphs [0009] to [0013], FIG. 1)

SUMMARY OF THE INVENTION

Problems to be Solved by the Invention

As the conventional laser radar device is configured as described above, the shortening of the coherence length due to a factor such as fluctuation in environmental conditions invites a situation in which the coherence length is shorter than the width of the FFT gate in some cases. There is a problem such that when the coherence length becomes shorter than the width of the FFT gate, the heterodyne efficiency lowers, thus degrading the measurement precision of the wind speed.

The present invention is made to solve the foregoing problem, and an object of the invention is to provide a laser radar device capable of measuring the wind speed at a higher precision even when the coherence length is changed due to a factor such as fluctuation in environmental conditions.

Means for Solving the Problems

A laser radar device according to the present invention includes: a laser light receiver that receives laser light to output a received signal of the laser light, the laser light being radiated in the atmosphere from a laser light radiator that radiates laser light in the atmosphere; and reflected by a measurement target existing in the atmosphere to be returned; a spectrum calculator that performs frequency analysis on a received signal outputted from the laser light receiver by a unit of a range gate to calculate a spectrum of the received signal; and a setting changer that calculates a coherence length based on a spectrum of the received signal calculated by the spectrum calculator, and performs a setting change to shorten a width of the range gate in case where the coherence length is shorter than the width of the range gate, wherein in case where the setting change to shorten the width is performed by the setting changer, the spectrum calculator performs frequency analysis on the received signal outputted from the laser light receiver by the unit of the range gate with the width after the setting change to calculate the spectrum of the received signal.

Effect of the Invention

According to the present invention, it is configured that there is provided the setting changer that calculates the coherence length based on the spectrum of the received signal calculated by the spectrum calculator, and performs the setting change to shorten the width of the range gate in case where the coherence length is shorter than the width of the range gate, and in case where the setting change to shorten the width is performed by the setting changer, the spectrum calculator performs frequency analysis on the received signal outputted from the laser light receiver by the unit of the range gate with the width after the setting change to calculate the spectrum of the received signal; thus, there is an advantageous effect that can measure the wind speed at a higher precision even when the coherence length is changed due to a factor such as fluctuation in environmental conditions.

BRIEF DESCRIPTION OF THE DRAWINGS

FIGS. 10(a) and 10(b) are explanatory diagrams depicting heterodyne efficiencies in case of a coherence length longer than the width of an FFT gate (range gate) and in case of the coherence length shorter than the width thereof.

MODES FOR CARRYING OUT THE INVENTION

In the following, in order to describe the present invention in more detail, embodiments for carrying out the invention will be described with reference to the accompanying drawings.

First Embodiment

Figure 1:
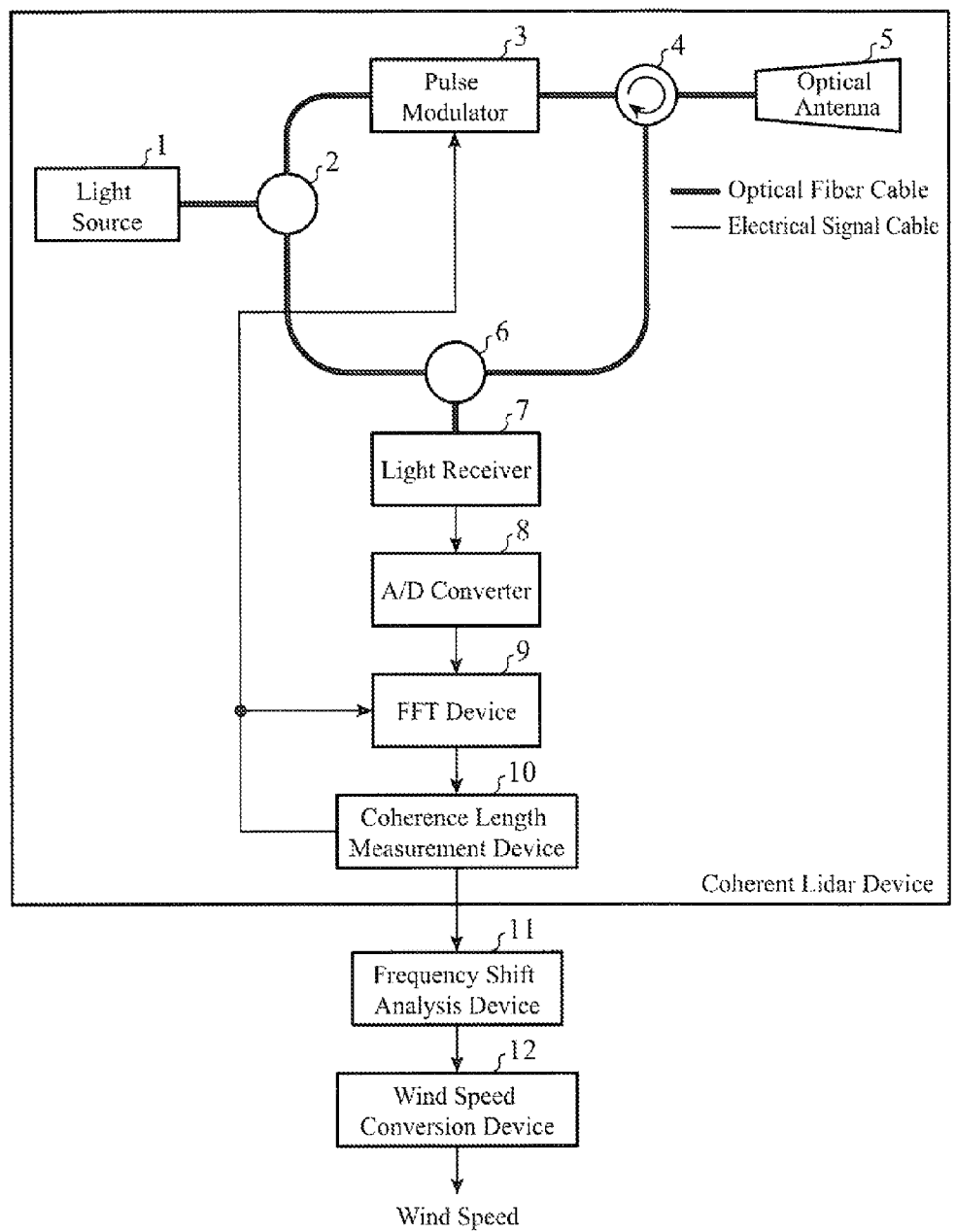
FIG. 1 is a configuration diagram depicting a laser radar device mounting a coherent lidar device thereon according to a first embodiment of the present invention.

FIG. 1 is a configuration diagram depicting a laser radar device mounting a coherent lidar device thereon according to a first embodiment of the present invention.

In FIG. 1, a light source 1 is a device that oscillates continuous wave light (laser light) with a single frequency, referred to as local light.

A light distributor 2 is a device that distributes the continuous wave light oscillated from the light source 1 into two beams, and outputs one continuous wave light to a pulse modulator 3 and outputs the other continuous wave light to an optical coupler 6.

The pulse modulator 3 is a device that gives a predetermined frequency shift to the continuous wave light outputted from the light distributor 2, and also performs pulse modulation on the continuous wave light whose frequency has been shifted and outputs the pulsed light to an optical circulator 4.

The optical circulator 4 is a device that outputs the pulsed light outputted from the pulse modulator 3 to an optical antenna 5, and outputs the scattered light received by the optical antenna 5 to the optical coupler 6.

The optical antenna 5 is a device that radiates the pulsed light outputted from the optical circulator 4 in the atmosphere, and then receives the scattered light (pulsed light) that is reflected by an aerosol (measurement target) existing in the atmosphere to be returned.

It is to be noted that the light source 1, the light distributor 2, the pulse modulator 3, the optical circulator 4, and the optical antenna 5 configure a laser light radiator.

The optical coupler 6 is a device that multiplexes the continuous wave light outputted from the light distributor 2 with the scattered light outputted from the optical circulator 4, and outputs an optical signal of the multiplexed light to a light receiver 7.

The light receiver 7 is a device that performs heterodyne detection on the optical signal outputted from the optical coupler 6 to convert the optical signal into an electrical signal, and outputs the electrical signal to an A/D converter 8 as a received signal.

It is to be noted that the optical circulator 4, the optical antenna 5, the optical coupler 6, and the light receiver 7 configure a laser light receiver.

The A/D converter 8 is a device that converts the received signal outputted from the light receiver 7 from an analog signal to a digital signal.

An FFT device 9 that is a fast Fourier analyzer comprises, for example, a semiconductor integrated circuit mounting a CPU thereon, or a one-chip microcomputer, etc. and executes the processing to perform frequency analysis on the received signal in the form of a digital signal outputted from the A/D converter 8 by a unit of an FFT gate (range gate) with a width that is set by a coherence length measurement device 10 to calculate the spectrum of the received signal.

It is to be noted that the A/D converter 8 and the FFT device 9 configure a spectrum calculator.

The coherence length measurement device 10 comprises, for example, a semiconductor integrated circuit mounting a CPU thereon, or a one-chip microcomputer, etc. and calculates a coherence length based on the spectrum calculated by the FFT device 9, and performs, in case where the coherence length is shorter than the FFT gate width, a setting change to shorten the FFT gate width and a pulse width of the pulsed light outputted from the pulse modulator 3 such that the FFT gate width and the pulse width match the coherence length. It is to be noted that the coherence length measurement device 10 configures a setting changer.

A frequency shift analysis device 11 comprises, for example, a semiconductor integrated circuit mounting a CPU thereon, or a one-chip microcomputer, etc. and executes the processing to calculate an amount of frequency shift that occurs with the movement of the aerosol based on the spectrum calculated by the FFT device 9. It is to be noted that the frequency shift analysis device 11 configures a frequency shift amount calculator.

A wind speed conversion device 12 comprises, for example, a semiconductor integrated circuit mounting a CPU thereon, or a one-chip microcomputer, etc. and executes the processing to convert a wind speed (moving speed of the aerosol) in a laser irradiation direction from the frequency shift amount calculated by the frequency shift analysis device 11. It is to be noted that the wind speed conversion device 12 configures a speed calculator.

In the laser radar device of FIG. 1, for example, an optical line such as an optical fiber cable is used for connections between the light source 1 and the light distributor 2, between the light distributor 2 and the pulse modulator 3, between the pulse modulator 3 and the optical circulator 4, between the optical circulator 4 and the optical antenna 5, between the light distributor 2 as well as the optical circulator 4 and the optical coupler 6, and between the optical coupler 6 and the light receiver 7.

Further, an electrical line such as an electrical signal cable is used for connections between the light receiver 7 and the A/D converter 8, between the A/D converter 8 and the FFT device 9, between the FFT device 9 and the coherence length measurement device 10, between the coherence length measurement device 10 and the frequency shift analysis device 11, between the frequency shift analysis device 11 and the wind speed conversion device 12, and between the coherence length measurement device 10 and the pulse modulator 3.

Next, an operation is described.

First, the light source 1 oscillates continuous wave light with a single frequency, referred to as local light.

When the light source 1 oscillates the continuous wave light, the light distributor 2 distributes the continuous wave light into two beams, and output one continuous wave light to the pulse modulator 3 and the second continuous wave light to the optical coupler 6.

Upon receiving the continuous wave light from the light distributor 2, the pulse modulator 3 gives a predetermined frequency shift to the continuous wave light, performs pulse modulation on the frequency-shifted continuous wave light by using a modulation signal having a predetermined pulse width and a repetitive cycle to generate pulsed light, and outputs the pulsed light to the optical circulator 4.

The pulse width $P_w$ of the pulsed light to be generated by the pulse modulator 3 is adjusted by, for example, the coherence length measurement device 10 to be described later controlling the pulse width of the modulation signal.

In this case, there is described an example in which the pulse modulator 3 gives a predetermined frequency shift to the continuous wave light, and the modulation signal having the predetermined pulse width and the repetitive cycle are used to pulse the frequency-shifted continuous wave light; however, for example, an acousto-optic device that gives a predetermined frequency shift to the continuous wave light may be interposed between the light distributor 2 and the optical coupler 6, such that the pulse modulator 3 specifically performs the processing to pulse the continuous wave light outputted from the light distributor 2 by using the modulation signal with the predetermined pulse width and the repetitive cycle.

The optical circulator 4 outputs, upon receiving the pulsed light from the pulse modulator 3, the pulsed light to the optical antenna 5.

In this manner, the pulsed light is radiated in the atmosphere from the optical antenna 5.

The pulsed light radiated in the atmosphere is scattered by a scattering body such as aerosol that is floating in the air. A portion of the scattered pulsed light (scattered light) is received by the optical antenna 5.

At this time, since the scattering body such as aerosol is moving with the wind, the scattered light received by the optical antenna 5 involves a Doppler shift frequency that corresponds to the wind speed.

When the optical antenna 5 receives the scattered light, the optical circulator 4 outputs the scattered light to the optical coupler 6.

The optical coupler 6 multiplexes the continuous wave light outputted from the light distributor 2 with the scattered light outputted from the optical circulator 4, and outputs the optical signal of the multiplexed light to the light receiver 7.

Upon receiving the optical signal from the optical coupler 6, the light receiver 7 performs heterodyne detection on the optical signal, and converts the optical signal to the electrical signal, and outputs the electrical signal to the A/D converter 8 as the received signal.

It is to be noted that the frequency shift amount of the received signal takes the same value as the Doppler shift frequency corresponding to the wind speed.

Upon receiving the received signal from the light receiver 7, the A/D converter 8 converts the received signal from the analog signal to the digital signal, and outputs the received signal in the form of the digital signal to the FFT device 9.

The width $G_w$ of the FFT gate (range gate) is set by the coherence length measurement device 10 to be described later, and the FFT device 9 performs frequency analysis on the received signal in the form of the digital signal outputted from the A/D converter 8 by the unit of the FFT gate to calculate the spectrum v of the received signal (see FIG. 10).

More specifically, the FFT device 9 performs the Fourier transform on the received signal in the form of the digital signal outputted from the A/D converter 8 per FFT gate, and performs incoherent integration on the received signal after Fourier transform by the number of integrations N that is set in advance to calculate the spectrum v of the received signal.

When the FFT device 9 calculates the spectrum v, as depicted in FIGS. 2(a) and 2(b), the coherence length measurement device 10 specifies the spectral width Δv of the spectrum v.

Upon specifying the spectral width Δv, the coherence length measurement device 10 assigns, for example, the spectral width Δv in the following equation (1) to calculate a coherence length $L_c$.

$$L_c = \sqrt{\frac{2\ln 2}{\pi}} \frac{c}{\Delta v} \qquad (1)$$

In Equation (1), c represents the speed of light.

Upon calculating the coherence length $L_c$, the coherence length measurement device 10 compares the coherence length $L_c$ with the FFT gate width $G_w$ of the FFT device 9.

In case where the coherence length $L_c$ is longer than the FFT gate width $G_w$ ($L_c \geq G_w$), the amplitude of signal components is sufficiently larger as compared to the amplitude of noise components and the heterodyne efficiency is thus higher; thus, the coherence length measurement device 10 outputs the spectrum v calculated by the FFT device 9 to the frequency shift analysis device 11.

Meanwhile, in case where the coherence length $L_c$ is shorter than the FFT gate width $G_w$ ($L_c < G_w$), the amplitude of signal components is not sufficiently larger as compared to the amplitude of noise components and the heterodyne efficiency is thus lower as described above; hence, the spectrum v calculated by the FFT device 9 is not outputted to the frequency shift analysis device 11, and a setting change is performed on the FFT gate width $G_w$ of the FFT device 9 and on the pulse width $P_w$ of the pulsed light to be generated by the pulse modulator 3.

More specifically, shortening of the FFT gate width $G_w$ of the FFT device 9 improves the heterodyne efficiency as compared to a case where the FFT gate width $G_w$ is longer because of reduction in noise power in the range bin for measurement. Also, narrowing the pulse width $P_w$ of the pulsed light also improves the heterodyne efficiency. However, narrowing the pulse width $P_w$ of the pulsed light too much reduces the light reception power.

For this reason, the coherence length measurement device 10 performs a setting change, in case where the coherence length $L_c$ is shorter than the FFT gate width $G_w$ ($L_c < G_w$), to shorten the FFT gate width $G_w$ and the pulse width $P_w$ such that the FFT gate width $G_w$ and the pulse width $P_w$ match the coherence length $L_c$.

Figure 3:
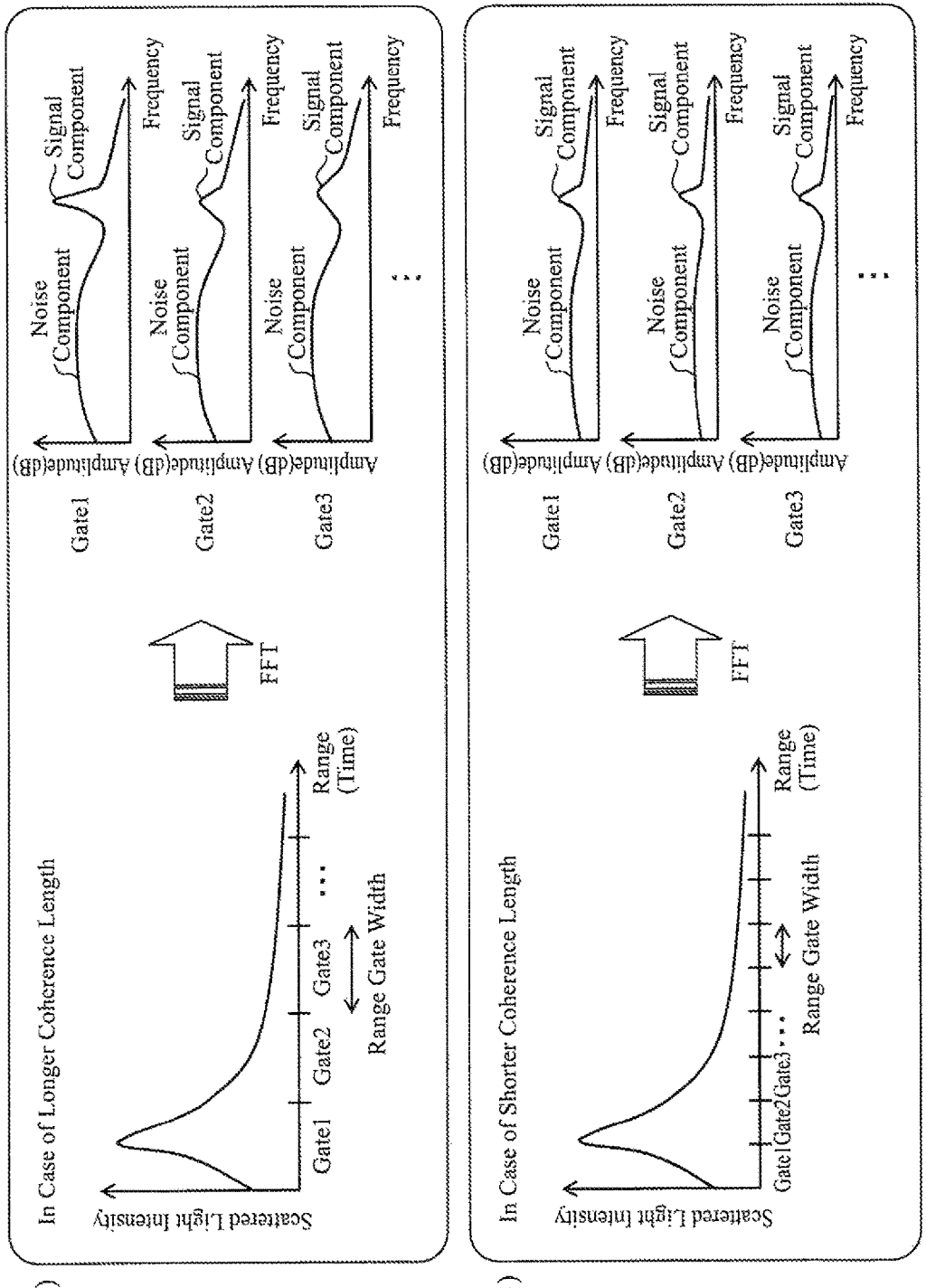
FIGS. 3(a) and 3(b) are explanatory diagrams depicting heterodyne efficiency in case of a coherence length longer than the width of an FFT gate (range gate) and in case of the coherence length shorter than the width thereof.

In this connection, FIGS. 3(*a*) and 3(*b*) are explanatory diagrams for illustrating the heterodyne efficiencies in case of the coherence length longer than the width of the FFT gate (range gate) and in case of the coherence length shorter than the width thereof.

FIG. 3(*a*) depicts a case in which the coherence length is longer than the width of the FFT gate, where the amplitude of signal components is sufficiently larger as compared to the amplitude of noise components, and the heterodyne efficiency is thus higher.

FIG. 3(*b*) depicts a case in which the coherence length is shorter than the width of the FFT gate, where the amplitude of signal components is not sufficiently larger as compared to the amplitude of noise components, and the heterodyne efficiency is thus lower.

When the coherence length measurement device 10 performs the setting change to shorten the pulse width $P_w$, the pulse modulator 3 generates pulsed light having the pulse width $P_w$ following the setting change, and outputs the pulsed light to the optical circulator 4.

Upon receiving the pulsed light having the pulse width $P_w$ following the setting change from the pulse modulator 3, the optical circulator 4 outputs the pulsed light to the optical antenna 5, and then outputs the scattered light received by the optical antenna 5 to the optical coupler 6.

The optical coupler 6 multiplexes the continuous wave light outputted from the light distributor 2 with the scattered light outputted from the optical circulator 4 (the scattered light of the pulsed light having the pulse width $P_w$ following the setting change), and outputs the optical signal of the multiplexed light to the light receiver 7.

Upon receiving the optical signal from the optical coupler 6, the light receiver 7 performs heterodyne detection on the optical signal, and converts the optical signal into the electrical signal, and outputs the electrical signal to the A/D converter 8 as the received signal.

Upon receiving the received signal from the light receiver 7, the A/D converter 8 converts the received signal from the analog signal to the digital signal, and outputs the received signal in the form of the digital signal to the FFT device 9.

The FFT device 9 performs frequency analysis on the received signal outputted from the A/D converter 8 by the unit of the FFT gate having the width $G_w$ of which the setting change has been performed by the coherence length measurement device 10 to calculate the spectrum v of the received signal.

When the FFT device 9 calculates the spectrum v, the coherence length measurement device 10 calculates the coherence length $L_c$ in the same manner as above, and outputs the spectrum v outputted from the FFT device 9 to the frequency shift analysis device 11 when the coherence length $L_c$ has become longer than the FFT gate width $G_w$ ($L_c \geq G_w$).

Meanwhile, in case where the coherence length $L_c$ is shorter than the FFT gate width $G_w$ ($L_c < G_w$), the setting change is performed again to shorten the FFT gate width $G_w$ and the pulse width $P_w$.

Figure 2:
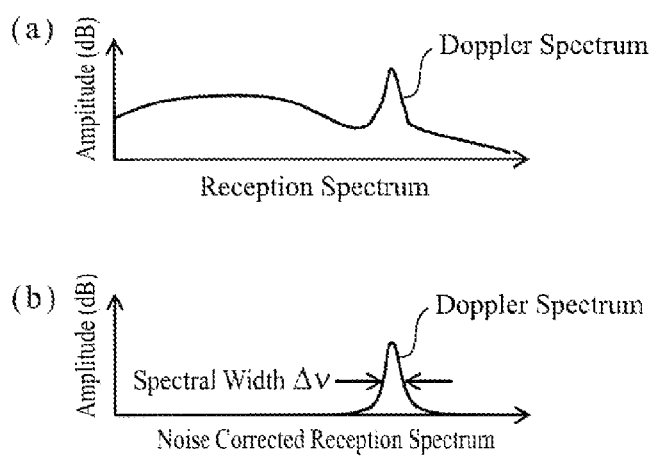
FIGS. 2(a) and 2(b) are explanatory diagrams depicting calculation processing of a coherence length.

Upon receiving the spectrum v calculated by the FFT device 9 from the coherence length measurement device 10, as depicted in FIG. 2(*b*), the frequency shift analysis device 11 carries out noise correction of the spectrum v (since the noise correction processing is a known technology, detailed description thereof is omitted here). For example, an gravity center arithmetic operation is carried out on the noise-corrected spectrum v to calculate the amount of frequency shift that occurs with the movement of the aerosol. Since the processing itself of calculating the frequency shift amount based on the spectrum v is a known technology, detailed description thereof is omitted here.

When the frequency shift analysis device 11 calculates the frequency shift amount, the wind speed conversion device 12 performs the conversion to the wind speed in the laser irradiation direction (moving speed of the aerosol) based on the frequency shift amount. Since the processing itself of calculating the wind speed based on the frequency shift amount is a known technology, detailed description thereof is omitted here.

As is clear from above, according to the first embodiment, the configuration is as follows: the coherence length measurement device 10 is provided to calculate the coherence length $L_c$ based on the spectrum v calculated by the FFT device 9 and perform, in case where the coherence length $L_c$ is shorter than the FFT gate width $G_w$, the setting change to shorten the FFT gate width $G_w$ and the pulse width $P_w$, and in case where the setting change is performed by the coherence length measurement device 10 to shorten the FFT gate width $G_w$ and the pulse width $P_w$, the FFT device 9 performs frequency analysis on the received signal outputted from the A/D converter 8 by the unit of the FFT gate following the setting change to calculate the spectrum v of the received signal. Thus, there is rendered an advantageous effect such that even when the coherence length $L_c$ is changed due to a factor such as fluctuation in environmental conditions, a higher heterodyne efficiency can be achieved.

More specifically, in case where the coherence length $L_c$ is shorter than the FFT gate width $G_w$, shortening the FFT gate width $G_w$ reduces noise power in the range bin for measurement and improves the heterodyne efficiency. Thus, a signal intensity is achieved in a level equal to that in the case of the longer FFT gate width $G_w$. Hence, the SNR (Signal to Noise ratio) is enhanced, and the measurement precision of the wind speed can be improved.

According to the first embodiment, there is described an example in which the coherence length measurement device 10 shortens both the FFT gate width $G_w$ and the pulse width $P_w$; however, the measurement precision of the wind speed can be still improved by shortening only the FFT gate width $G_w$.

Second Embodiment

Figure 4:
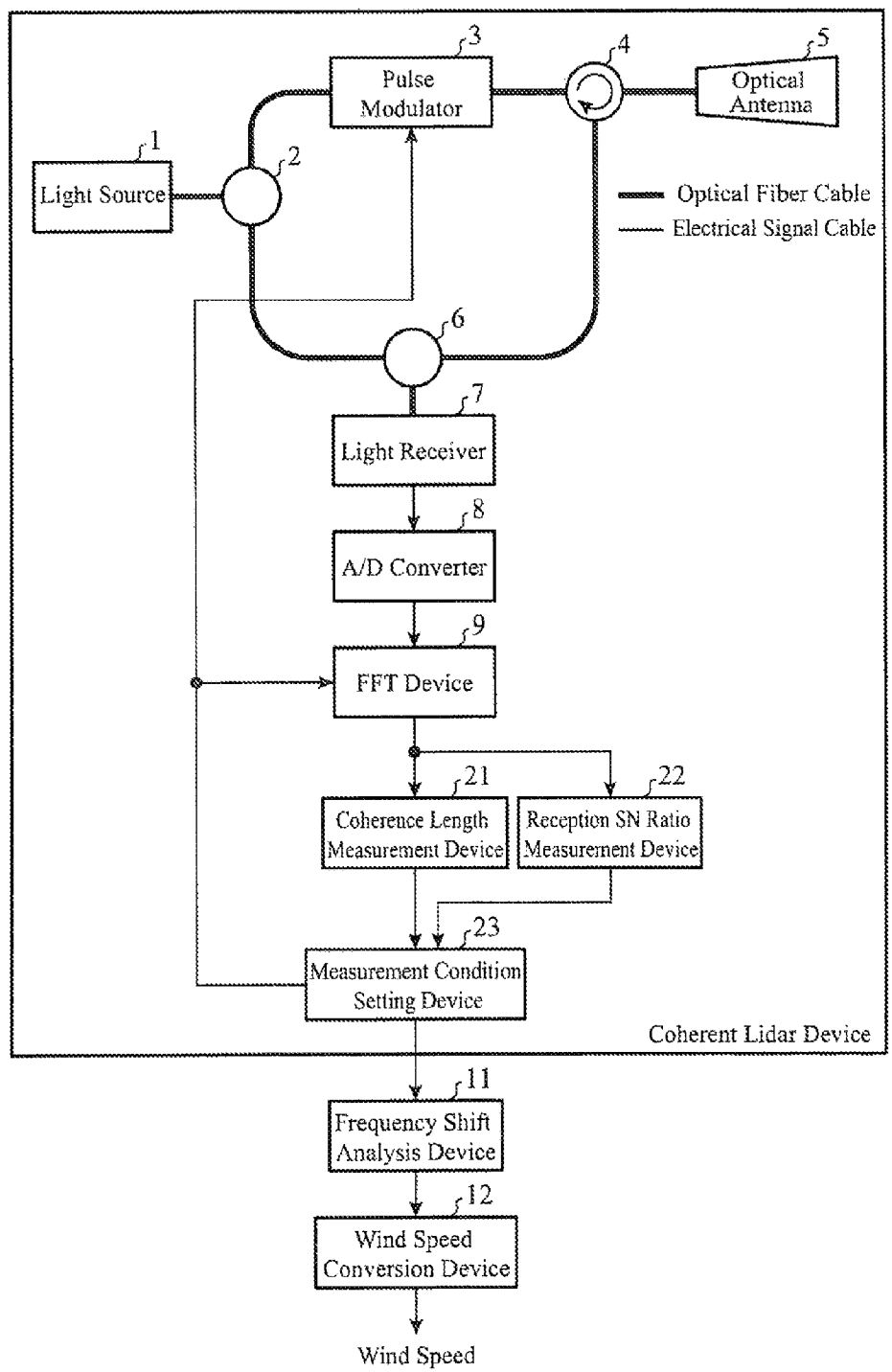
FIG. 4 is a configuration diagram depicting a laser radar device mounting a coherence lidar device thereon according to a second embodiment of the present invention.

FIG. 4 is a configuration diagram of a laser radar device mounting a coherent lidar device thereon according to a second embodiment of the present invention. In the figure, the same reference numerals as those in FIG. 1 denote the same or corresponding parts, and thus descriptions thereof are omitted.

A coherence length measurement device 21 comprises, for example, a semiconductor integrated circuit mounting a CPU thereon, or a one-chip microcomputer, etc. and performs the processing to calculate a coherence length $L_c$ based on a spectrum calculated by the FFT device 9.

A reception SN ratio measurement device 22 comprises, for example, a semiconductor integrated circuit mounting a CPU thereon, or a one-chip microcomputer, etc. and executes the processing to calculate an SNR based on the spectrum calculated by the FFT device 9. It is to be noted that the reception SN ratio measurement device 22 configures a signal-to-noise ratio calculator.

A measurement condition setting device 23 comprises, for example, a semiconductor integrated circuit mounting a CPU thereon, or a one-chip microcomputer, and performs, in case where the coherence length $L_c$ calculated by the coherence length measurement device 21 is shorter than the FFT gate width $G_w$ of the FFT device 9, the setting change to shorten the FFT gate width $G_w$ and the pulse width $P_w$ when the SNR calculated by the reception SN ratio measurement device 22 is higher than a reference SNR (a predetermined setting value), while the setting device performs a setting change to increase the number of integrations N (the number of times to perform incoherent integration on a received signal) for a received signal after Fourier transform (received signal in the frequency domain) to be performed when the FFT device 9 calculates the spectrum v of the received signal, when the SNR is lower than the reference SNR.

It is to be noted that the coherence length measurement device 21 and the measurement condition setting device 23 configure a setting changer.

In the laser radar device of FIG. 4, for example, an optical line such as an optical fiber cable is used for connections between the light source 1 and the light distributor 2, between the light distributor 2 and the pulse modulator 3, between the pulse modulator 3 and the optical circulator 4, between the optical circulator 4 and the optical antenna 5, between the light distributor 2 as well as the optical circulator 4 and the optical coupler 6, and between the optical coupler 6 and the light receiver 7.

Further, for example, an electrical line such as an electrical signal cable is used for connections between the light receiver 7 and the A/D converter 8, between the A/D converter 8 and the FFT device 9, between the FFT device 9 and the coherence length measurement device 21 as well as the reception SN ratio measurement device 22, between the coherence length measurement device 21 as well as the reception SN ratio measurement device 22 and the measurement condition setting device 23, between the measurement condition setting device 23 and the frequency shift analysis device 11, between the frequency shift analysis device 11 and the wind speed conversion device 12, and between the measurement condition setting device 23 and the pulse modulator 3 as well as the FFT device 9.

Next, an operation is described.

First, the light source 1 oscillates continuous wave light with a single frequency, referred to as local light.

When the light source 1 oscillates the continuous wave light, in the same manner as in the first embodiment, the light distributor 2 distributes the continuous wave light into two beams, and outputs one continuous wave light to the pulse modulator 3 and the other continuous wave light to the optical coupler 6.

Upon receiving the continuous wave light from the light distributor 2, in the same manner as in the first embodiment, the pulse modulator 3 gives a predetermined frequency shift to the continuous wave light, performs pulse modulation by using a modulation signal with a predetermined pulse width and a repetitive cycle on the continuous wave light whose frequency has been shifted to generate pulsed light, and outputs the pulsed light to the optical circulator 4.

The pulse width $P_w$ of the pulsed light generated by the pulse modulator 3 is, for example, adjusted with the measurement condition setting device 23 to be described later controlling the pulse width of the modulation signal.

Upon receiving the pulsed light from the pulse modulator 3, in the same manner as in the first embodiment, the optical circulator 4 outputs the pulsed light to the optical antenna 5.

In this manner, the pulsed light is radiated in the atmosphere from the optical antenna 5.

The pulsed light radiated in the atmosphere is scattered by a scattering body such as aerosol floating in the air, and a portion of the scattered pulsed light (scattered light) is received by the optical antenna 5.

At this time, since the scattering body such as aerosol is moving with the wind, the scattered light received by the optical antenna 5 involves a Doppler shift frequency corresponding to the wind speed.

When the optical antenna 5 receives the scattered light, in the same manner as in the first embodiment, the optical circulator 4 outputs the scattered light to the optical coupler 6.

The optical coupler 6 multiplexes the continuous wave light outputted from the light distributor 2 with the scattered light outputted from the optical circulator 4, and outputs an optical signal of the multiplexed light to the light receiver 7.

Upon receiving the optical signal from the optical coupler 6, in the same as in the first embodiment, the light receiver 7 performs heterodyne detection on the optical signal to convert the optical signal to an electrical signal, and outputs the electrical signal to the A/D converter 8 as a received signal.

It is to be noted that the frequency shift amount of the received signal takes the same value as the Doppler shift frequency corresponding to the wind speed.

Upon receiving the received signal from the light receiver 7, as in the foregoing first embodiment, the A/D converter 8 converts the received signal from an analog signal to a digital signal, and outputs the received signal in the form of the digital signal to the FFT device 9.

The FFT device 9 has the width $G_w$ of the FFT gate set by the measurement condition setting device 23 to be described later, and performs frequency analysis on the received signal in the form of the digital signal outputted from the A/D converter 8 by a unit of the FFT gate to calculate the spectrum v of the received signal (see FIG. 10).

More specifically, the FFT device 9 performs the Fourier transform on the received signal in the form of the digital signal outputted from the A/D converter 8 per FFT gate, and performs incoherent integration on the received signal after Fourier transform by the number of integrations N that is set in advance to calculate the spectrum v of the received signal.

As depicted in FIGS. 2(*a*) and 2(*b*), the coherence length measurement device 21 specifies the spectral width Δv of the spectrum v when the FFT device 9 calculates the spectrum v.

Upon specifying the spectral width Δv, like the coherence length measurement device 10 of FIG. 1, the coherence length measurement device 21 assigns the spectral width Δv in the above Equation (1) to calculate the coherence length $L_c$.

When the FFT device 9 calculates the spectrum v, for example, the reception SN ratio measurement device 22 divides, per FFT gate, the spectrum v of the received signal by the spectrum of a noise signal (signal of only noise without any signal mixed therein) that is retained in advance to calculate an SNR that is a signal-to-noise ratio.

When the coherence length measurement device 21 calculates the coherence length $L_c$ and the reception SN ratio measurement device 22 calculates the SNR, the measurement condition setting device 23 compares the coherence length $L_c$ with the FFT gate width $G_w$ of the FFT device 9.

The measurement condition setting device 23 outputs, in case where the coherence length $L_c$ is longer than the FFT gate width $G_w$ ($L_c \geq G_w$), the spectrum v calculated by the FFT device 9 to the frequency shift analysis device 11, since the amplitude of signal components is sufficiently larger as compared to the amplitude of noise components and the heterodyne efficiency is thus higher.

Meanwhile, in case where the coherence length $L_c$ is shorter than the FFT gate width $G_w$ ($L_c < G_w$), as described above, the amplitude of signal components is not sufficiently larger as compared to the amplitude of noise components, and the heterodyne efficiency is thus lower; hence, the SNR calculated by the reception SN ratio measurement device 22 is compared with the reference SNR without outputting the spectrum v calculated by the FFT device 9 to the frequency shift analysis device 11.

The measurement condition setting device 23 performs, in case where the SNR is higher than the reference SNR, the setting change to shorten the FFT gate width $G_w$ and the pulse width $P_w$ such that the FFT gate width $G_w$ and the pulse width $P_w$ match the coherence length $L_c$ in order to improve the heterodyne efficiency.

Meanwhile, in case where the SNR is lower than the reference SNR, there is a high possibility such that even when the setting change of the FFT gate width $G_w$ and the pulse width $P_w$ is performed, a desired wind speed measurement precision cannot be obtained; the wind speed measurement precision can, however, be improved by increasing the number of integrations N of the received signal after Fourier transform to be performed when the FFT device 9 calculates the spectrum v of the received signal (note: the calculation processing time becomes longer).

Thus, the measurement condition setting device 23 performs, in case where the SNR is lower than the reference SNR, the setting change to increase the number of integrations N of the received signal after Fourier transform to be performed when the FFT device 9 calculates the spectrum v of the received signal.

The pulse modulator 3 generates the pulsed light having the pulse width $P_w$ following the setting change when the setting change to shorten the pulse width $P_w$ is performed by the measurement condition setting device 23, and outputs the pulsed light to the optical circulator 4.

Upon receiving the pulsed light having the pulse width $P_w$ following the setting change from the pulse modulator 3, the optical circulator 4 outputs the pulsed light to the optical antenna 5, and then outputs the scattered light received by the optical antenna 5 to the optical coupler 6.

The optical coupler 6 multiplexes the continuous wave light outputted from the light distributor 2 with the scattered light outputted from the optical circulator 4 (scattered light of the pulsed light having the pulse width $P_w$ following the setting change) to output the optical signal of the multiplexed light to the light receiver 7.

Upon receiving the optical signal from the optical coupler 6, the light receiver 7 performs heterodyne detection on the optical signal to convert the optical signal into an electrical signal, and outputs the electrical signal to the A/D converter 8 as the received signal.

Upon receiving the received signal from the light receiver 7, the A/D converter 8 converts the received signal from an analog signal to a digital signal, and outputs the received signal in the form of the digital signal to the FFT device 9.

The FFT device 9 performs frequency analysis on the received signal outputted from the A/D converter 8 by the unit of the FFT gate having the width $G_w$ with the setting changed by the measurement condition setting device 23 to calculate the spectrum v of the received signal. In case where the setting change is performed on the number of integrations N and not on the FFT gate width $G_w$, the received signal outputted from the A/D converter 8 is Fourier transformed, and incoherent integration is performed on the received signal after Fourier transform by the number of integrations N with the setting changed by the measurement condition setting device 23 to calculate the spectrum v of the received signal.

When the FFT device 9 calculates the spectrum v, the coherence length measurement device 21 calculates the coherence length $L_c$ in the same manner as above.

When the FFT device 9 calculates the spectrum v, the reception SN ratio measurement device 22 calculates the SNR in the same manner as above.

The measurement condition setting device 23 outputs, when the coherence length $L_c$ has become longer than the FFT gate width $G_w$ ($L_c \geq G_w$), the spectrum v calculated by the FFT device 9 to the frequency shift analysis device 11.

Meanwhile, in case where the coherence length $L_c$ is shorter than the FFT gate width $G_w$ ($L_c < G_w$), the setting change is again performed to shorten the FFT gate width $G_w$ and the pulse width $P_w$, or increase the number of integrations N of the received signal.

Upon receiving the spectrum v calculated by the FFT device 9 from the measurement condition setting device 23, the frequency shift analysis device 11 calculates the amount of frequency shift that occurs with the movement of an aerosol in the same manner as in the first embodiment.

When the frequency shift analysis device 11 calculates the frequency shift amount, the wind speed conversion device 12 performs the conversion to the wind speed in the laser irradiation direction (moving speed of the aerosol) based on the frequency shift amount in the same manner as in the first embodiment.

As is clear from above, the configuration according to the second embodiment includes the reception SN ratio measurement device 22 for calculating the SNR based on the spectrum calculated by the FFT device 9, and in case where the coherence length $L_c$ calculated by the coherence length measurement device 21 is shorter than the FFT gate width $G_w$ of the FFT device 9, the measurement condition setting device 23 performs the setting change to shorten the FFT gate width $G_w$ and the pulse width $P_w$ when the SNR calculated by the reception SN ratio measurement device 22 is higher than the reference SNR, and performs, when the SNR is lower than the reference SNR, the setting change to increase the number of integrations N of the received signal after Fourier transform to be performed when the FFT device 9 calculates the spectrum v of the received signal; thus, there is rendered an advantageous effect such that even in case where the SNR is lower than the reference SNR, the precision of measuring the wind speed can be improved.

While there is described an example according to the second embodiment in which the measurement condition setting device 23 shortens both the FFT gate width $G_w$ and the pulse width $P_w$, the precision of measuring the wind speed can be still improved by shortening only the FFT gate width $G_w$.

Third Embodiment

Figure 5:
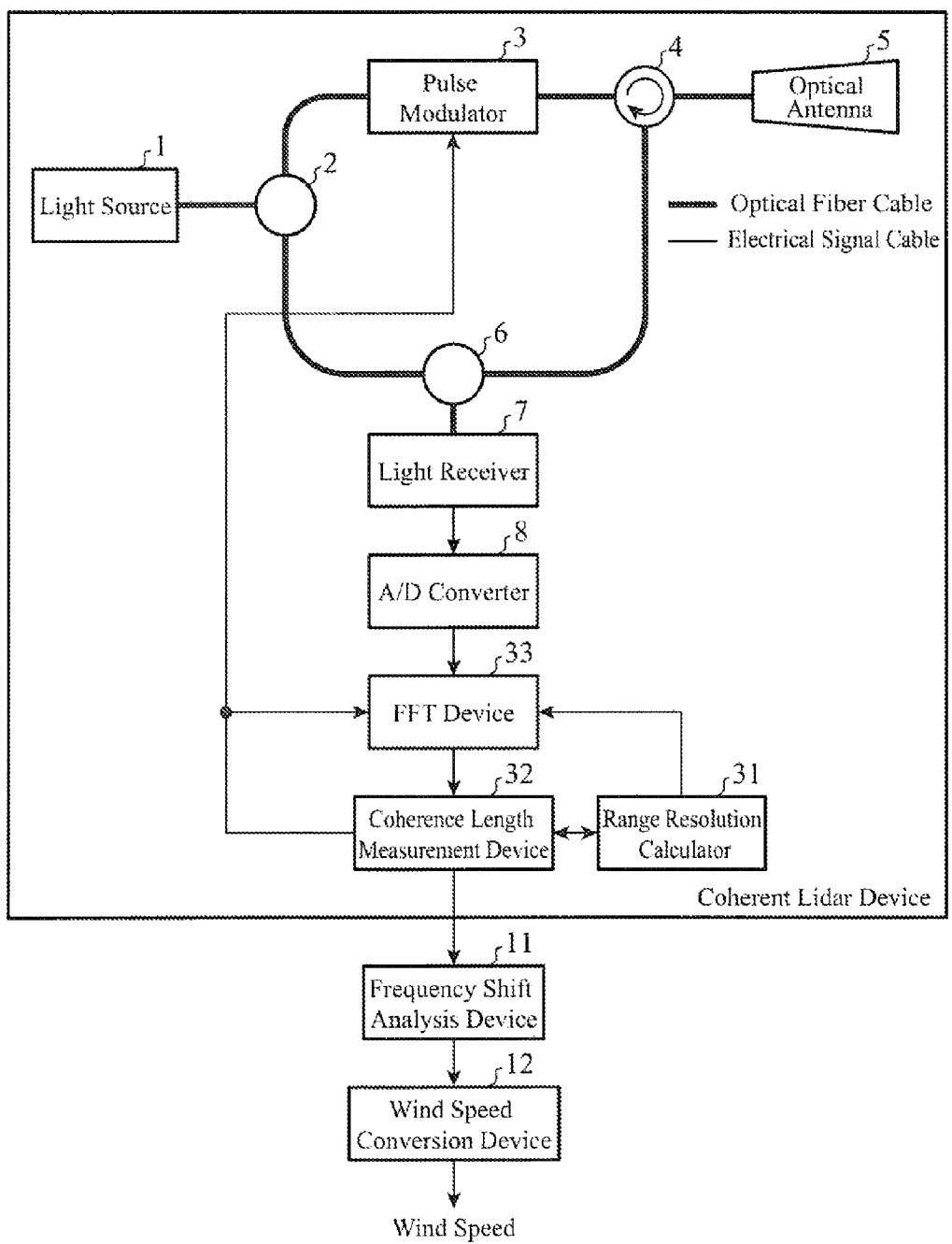
FIG. 5 is a configuration diagram depicting a laser radar device mounting a coherent lidar device thereon according to a third embodiment of the present invention.

FIG. 5 is a configuration diagram depicting a laser radar device mounting a coherent lidar device thereon according to a third embodiment of the present invention. In the figure, the same reference numerals as those in FIG. 1 denote the same or corresponding parts, and thus descriptions thereof are omitted.

A range resolution calculator 31 comprises, for example, a semiconductor integrated circuit mounting a CPU thereon, or a one-chip microcomputer, etc. and executes the processing to calculate a range resolution ΔR based on an FFT gate width $G_w$ (or pulse width $P_w$) with the setting changed by a coherence length measurement device 32. It is to be noted that the range resolution calculator 31 configures a range resolution calculator.

The coherence length measurement device 32 comprises, for example, a semiconductor integrated circuit mounting a CPU thereon, or a one-chip microcomputer, etc. and calculates a coherence length $L_c$ based on a spectrum v calculated by an FFT device 33 and performs, in case where the coherence length $L_c$ is shorter than the FFT gate width $G_w$, a setting change to shorten the FFT gate width $G_w$ and the pulse width $P_w$ of the pulsed light to be outputted from the pulse modulator 3 such that the FFT gate width $G_w$ and the pulse width $P_w$ match the coherence length $L_c$.

Further, in case where the range resolution ΔR calculated by the range resolution calculator 31 is lower than a range resolution $\Delta R_{USER}$ designated by the user, the coherence length measurement device 32 executes the processing to change the setting of the FFT gate width $G_w$ and the pulse width $P_w$ to a width corresponding to the range resolution $\Delta R_{USER}$ designated by the user (FFT gate width $G_{wUSER}$, and pulse width $P_{wUSER}$).

It is to be noted that the coherence length measurement device 32 configures a setting changer.

The FFT device 33 comprises, for example, a semiconductor integrated circuit mounting a CPU thereon, or a one-chip microcomputer, etc. and executes the processing to perform, in case where the range resolution ΔR calculated by the range resolution calculator 31 is higher than the range resolution $\Delta R_{USER}$ designated by the user, frequency analysis on the received signal in the form of a digital signal outputted from the A/D converter 8 by an FFT gate unit of the width $G_w$ to calculate the spectrum v of the received signal, and further to convert the spectrum v to a spectrum $v_{USER}$ in a range resolution $\Delta R_{USER}$ unit designated by the user, and output the converted spectrum $v_{USER}$ to the frequency shift analysis device 11.

Meanwhile, in case where the range resolution ΔR calculated by the range resolution calculator 31 is lower than the range resolution $\Delta R_{USER}$ designated by the user, the FFT device executes the processing to perform frequency analysis on the received signal in the form of the digital signal outputted from the A/D converter 8 by an FFT gate unit of the width $G_{wUSER}$ with the setting changed by the coherence length measurement device 32 to calculate the spectrum $v_{USER}$ of the received signal, and output the spectrum $v_{USER}$ to the frequency shift analysis device 11.

It is to be noted that the A/D converter 8 and the FFT device 33 configure a spectrum calculator.

In the laser radar device of FIG. 1, for example, an optical line such as an optical fiber cable is used for connections between the light source 1 and the light distributor 2, between the light distributor 2 and the pulse modulator 3, between the pulse modulator 3 and the optical circulator 4, between the optical circulator 4 and the optical antenna 5, between the light distributor 2 as well as the optical circulator 4 and the optical coupler 6, and between the optical coupler 6 and the light receiver 7.

Further, an electrical line such as an electrical signal cable is used for connections between the light receiver 7 and the A/D converter 8, between the A/D converter 8 and the FFT device 33, between the FFT device 33 and the coherence length measurement device 32 as well as the range resolution calculator 31, between the coherence length measurement device 32 and the range resolution calculator 31, between the coherence length measurement device 32 and the frequency shift analysis device 11, between the frequency shift analysis device 11 and the wind speed conversion device 12, and between the coherence length measurement device 32 and the pulse modulator 3.

Figure 6:
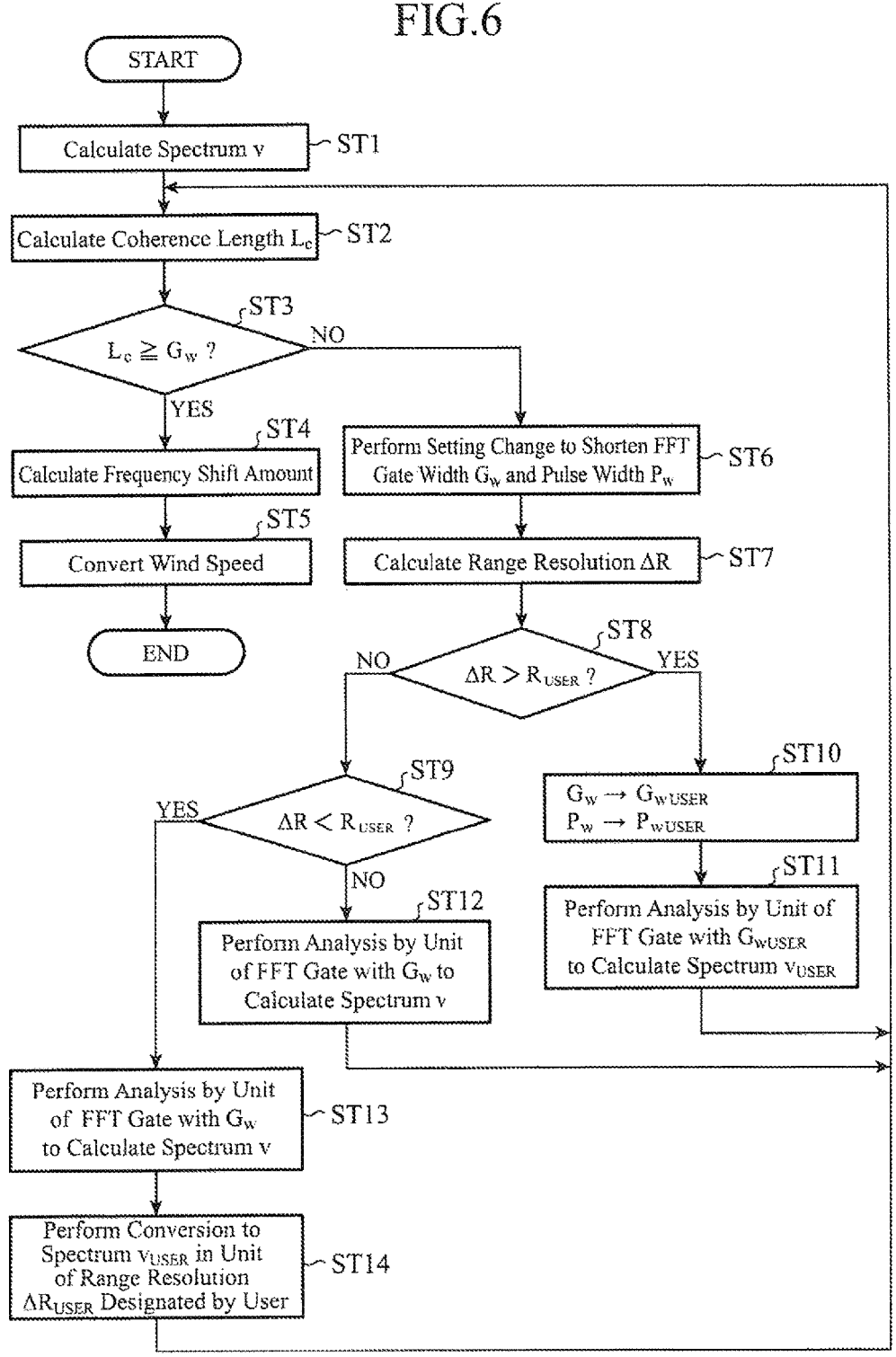
FIG. 6 is a flowchart depicting processing details of the coherence lidar device according to the third embodiment of the present invention.

FIG. 6 is a flowchart depicting processing details of the coherent lidar device according to the third embodiment of the present invention.

Next, an operation is described.

It is to be noted that since the features other than the range resolution calculator 31, the coherence length measurement device 32, and the FFT device 33 are the same as those of the first embodiment, detailed descriptions thereof are omitted.

The FFT device 33 has, like the FFT device 9 of FIG. 1, the width $G_w$ of the FFT gate set by the coherence length measurement device 32, and performs frequency analysis on the received signal in the form of a digital signal outputted from the A/D converter 8 by the unit of the FFT gate to calculate the spectrum v of the received signal (Step ST1).

More specifically, the FFT device 33 performs the Fourier transform on the received signal in the form of the digital signal outputted from the A/D converter 8 per FFT gate, and performs incoherent integration on the received signal after Fourier transform by the number of integrations N that is set in advance to calculate the spectrum v of the received signal.

When the FFT device 33 calculates the spectrum v, the coherence length measurement device 32 specifies the spectral width Δv of the spectrum v like the coherence length measurement device 10 of FIG. 1, and assigns the spectral width Δv in the above Equation (1) to calculate a coherence length $L_c$ (Step ST2).

Upon calculating the coherence length $L_c$, the coherence length measurement device 32 compares the coherence length $L_c$ with the FFT gate width $G_w$ of the FFT device 33 (Step ST3).

The coherence length measurement device 32 outputs, in case where the coherence length $L_c$ is longer than the FFT gate width $G_w$ ($L_c \geq G_w$), the spectrum v calculated by the FFT device 33 to the frequency shift analysis device 11 in the same manner as the coherence length measurement device 10 of FIG. 1.

Upon receiving the spectrum v calculated by the FFT device 33 from the coherence length measurement device 32, the frequency shift analysis device 11 calculates an amount of frequency shift that occurs with the movement of an aerosol in the same manner as in the first embodiment (Step ST4).

When the frequency shift analysis device 11 calculates the frequency shift amount, the wind speed conversion device 12 converts the frequency shift amount to a wind speed in a laser irradiation direction (moving speed of the aerosol) in the same manner as in the first embodiment (Step ST5).

The coherence length measurement device 32 performs, in case where the coherence length $L_c$ is shorter than the FFT gate width $G_w$ ($L_c < G_w$), a setting change to shorten the FFT gate width $G_w$ of the FFT device 33 and the pulse width $P_w$ of the pulsed light to be generated by the pulse modulator 3 without outputting the spectrum v calculated by the FFT device 33 to the frequency shift analysis device 11 in the same manner as the coherence length measurement device 10 of FIG. 1 (Step ST6).

When the coherence length measurement device 32 performs the setting change of the FFT gate width $G_w$ and the pulse width $P_w$, the range resolution calculator 31 calculates the range resolution ΔR based on the FFT gate width $G_w$ following the setting change, or the pulse width $P_w$ following the setting change, as represented by the following Equation (2) (Step ST7).

or $$\Delta R = \frac{CT}{2} \quad (2)$$

$$T = G_w \text{、}$$

またば、

$$T = P_w$$

or

In Equation (2), C represents the speed of light.

When the range resolution calculator 31 calculates the range resolution ΔR, the coherence length measurement device 32 compares the range resolution ΔR with the range resolution $\Delta R_{USER}$ designated by the user (Steps ST8 and ST9).

The coherence length measurement device 32 calculates, in case where the range resolution ΔR is lower than the range resolution $\Delta R_{USER}$ designated by the user ($\Delta R > \Delta R_{USER}$) the FFT gate width $G_{wUSER}$ and the pulse width $P_{wUSER}$ corresponding to the range resolution $\Delta R_{USER}$ designated by the user as represented by the following Equation (3), and changes the setting of the FFT gate width $G_w$ to the FFT gate width $G_{wUSER}$ and also changes the setting of the pulse width $P_w$ to the pulse width $P_{wUSER}$ (Step ST10).

$$T_{USER} = \frac{2\Delta R_{USER}}{C} \quad (3)$$

$$T_{USER} = G_{wUSER} = P_{wUSER}$$

After the setting of the FFT gate width $G_w$ and the pulse width $P_w$ is changed to the FFT gate width $G_{wUSER}$ and the pulse width $P_{wUSER}$ by the coherence length measurement device 32, upon receiving the received signal in the form of the digital signal from the A/D converter 8, the FFT device 33 performs frequency analysis on the received signal by the unit of the FFT gate having the width $G_{wUSER}$ to calculate the spectrum $v_{USER}$ of the received signal (Step ST11).

When the FFT device 33 calculates the spectrum $v_{USER}$, the coherence length measurement device 32 calculates the coherence length $L_c$ in the same manner as above, and when the coherence length $L_c$ has become longer than the FFT gate width $G_{wUSER}$ ($L_c \geq G_{wUSER}$), outputs the spectrum $v_{USER}$ calculated by the FFT device 33 to the frequency shift analysis device 11.

Meanwhile, in case where the coherence length $L_c$ is shorter than the FFT gate width $G_w$ ($L_c < G_{wUSER}$), the setting change of the FFT gate width $G_w$ and the pulse width $P_w$ is performed again.

Upon receiving the spectrum $v_{USER}$ calculated by the FFT device 33 from the coherence length measurement device 32, the frequency shift analysis device 11 calculates the amount of frequency shift that occurs with the movement of the aerosol in the same manner as in the first embodiment (Step ST4).

When the frequency shift analysis device 11 calculates the frequency shift amount, the wind speed conversion device 12 converts the frequency shift amount to the wind speed in the laser irradiation direction (moving speed of the aerosol) in the same manner as in the first embodiment (Step ST5).

In Steps ST8 and ST9, the coherence length measurement device 32 compares the range resolution ΔR with the range resolution $\Delta R_{USER}$ designated by the user, and notifies the FFT device 33, in case where the range resolution ΔR is higher than the range resolution $\Delta R_{USER}$ designated by the user ($\Delta R < \Delta R_{USER}$) or in case where the range resolution ≠R matches the range resolution $\Delta R_{USER}$ designated by the user ($\Delta R = \Delta R_{USER}$), to that effect.

Upon receiving the notification from the coherence length measurement device 32 that the range resolution ΔR matches the range resolution $\Delta R_{USER}$ designated by the user ($\Delta R = \Delta R_{USER}$), the FFT device 33 performs frequency analysis on the received signal in the form of the digital signal outputted from the A/D converter 8 by the unit of the FFT gate having the width $G_w$ that is set by the coherence length measurement device 32 to calculate the spectrum v of the received signal (Step ST12).

When the FFT device 33 calculates the spectrum v, the coherence length measurement device 32 calculates the coherence length $L_c$ in the same manner as above, and when the coherence length $L_c$ has become longer than the FFT gate width $G_{wUSER}$ ($L_c \geq G_{wUSER}$), outputs the spectrum v calculated by the FFT device 33 to the frequency shift analysis device 11.

Meanwhile, in case where the coherence length $L_c$ is shorter than the FFT gate width $G_w$ ($L_c < G_{wUSER}$), the setting change of the FFT gate width $G_w$ and the pulse width $P_w$ is performed again.

Upon receiving the spectrum v calculated by the FFT device 33 from the coherence length measurement device 32, the frequency shift analysis device 11 calculates the amount of frequency shift that occurs with the movement of the aerosol in the same manner as in the first embodiment (Step ST4).

When the frequency shift analysis device 11 calculates the frequency shift amount, the wind speed conversion device 12 converts the frequency shift amount to the wind speed in the laser irradiation direction (moving speed of the aerosol) in the same manner as in the first embodiment (Step ST5).

Upon receiving the notification from the coherence length measurement device 32 that the range resolution ΔR is higher than the range resolution ΔR$_{USER}$ designated by the user (ΔR<ΔR$_{USER}$), the FFT device 33 performs frequency analysis on the received signal in the form of the digital signal outputted from the A/D converter 8 by the unit of the FFT gate with the width G$_w$ set by the coherence length measurement device 32 to calculate the spectrum v of the received signal (Step ST13).

Upon calculating the spectrum v of the received signal, the FFT device 33 converts the spectrum v to the spectrum v$_{USER}$ in the unit of the range resolution ΔR$_{USER}$ designated by the user (Step ST14).

For example, the spectrum v corresponding to a plurality of FFT gates having the width G$_w$ are added thereto by an amount that falls to the FFT gate width G$_{wUSER}$ corresponding to the range resolution ΔR$_{USER}$ designated by the user to calculate a mean value of the added values as the spectrum v$_{USER}$ in the unit of the range resolution ΔR$_{USER}$ designated by the user.

When the FFT device 33 calculates the spectrum v$_{USER}$ in the unit of the range resolution ΔR$_{USER}$ designated by the user, the coherence length measurement device 32 calculates the coherence length L$_c$ in the same manner as above, and when the coherence length L$_c$ has become longer than the FFT gate width G$_{wUSER}$ (L$_c$≥G$_{wUSER}$), outputs the spectrum v$_{USER}$ calculated by the FFT device 33 to the frequency shift analysis device 11.

Meanwhile, in case where the coherence length L$_c$ is shorter than the FFT gate width G$_w$ (L$_c$<G$_{wUSER}$), the setting change of the FFT gate width G$_w$ and the pulse width P$_w$ is performed again.

Upon receiving the spectrum v$_{USER}$ calculated by the FFT device 33 from the coherence length measurement device 32, the frequency shift analysis device 11 calculates the amount of frequency shift that occurs with the movement of the aerosol in the same manner as in the first embodiment (Step ST4).

When the frequency shift analysis device 11 calculates the frequency shift amount, the wind speed conversion device 12 converts the frequency shift amount to the wind speed in the laser irradiation direction (moving speed of the aerosol) in the same manner as in the first embodiment (Step ST5).

As is clear from above, the configuration according to the third embodiment includes the range resolution calculator 31 configured to calculate the range resolution ΔR based on the FFT gate width G$_w$ (or the pulse width P$_w$) following the setting change conducted by the coherence length measurement device 32, and (1) in case where the range resolution ΔR calculated by the range resolution calculator 31 is higher than the range resolution ΔR$_{USER}$ designated by the user (ΔR<ΔR$_{USER}$), the FFT device 33 performs frequency analysis on the received signal in the form of the digital signal outputted from the A/D converter 8 by the unit of the FFT gate with the width G$_w$ that is set by the coherence length measurement device 32 to calculate the spectrum v of the received signal, and further, the FFT device converts the spectrum v to the spectrum v$_{USER}$ in the unit of the range resolution ΔR$_{USER}$ designated by the user and outputs the converted spectrum v$_{USER}$ to the frequency shift analysis device 11;

(2) In case where the range resolution ΔR calculated by the range resolution calculator 31 is lower than the range resolution ΔR$_{USER}$ designated by the user (ΔR>ΔR$_{USER}$), the coherence length measurement device 32 changes the setting of the FFT gate width G$_w$ to the FFT gate width G$_{wUSER}$, and also changes the setting of the pulse width P$_w$ to the pulse width P$_{wUSER}$, and the FFT device 33 performs frequency analysis on the received signal by the unit of the FFT gate with the width G$_{wUSER}$ with the setting changed by the coherence length measurement device 32 to calculate the spectrum v$_{USER}$ of the received signal, and outputs the spectrum v$_{USER}$ to the frequency shift analysis device 11. Because of this configuration, the wind speed is measured at a measurement precision according to the range resolution ΔR$_{USER}$ designated by the user, even when an environmental condition changes.

While there is described an example according to the third embodiment in which the coherence length measurement device 32 shortens both the FFT gate width G$_w$ and the pulse width P$_w$, improvement in the precision of measuring the wind speed can be still achieved through shortening of the FFT gate width G$_w$.

Fourth Embodiment

Figure 7:
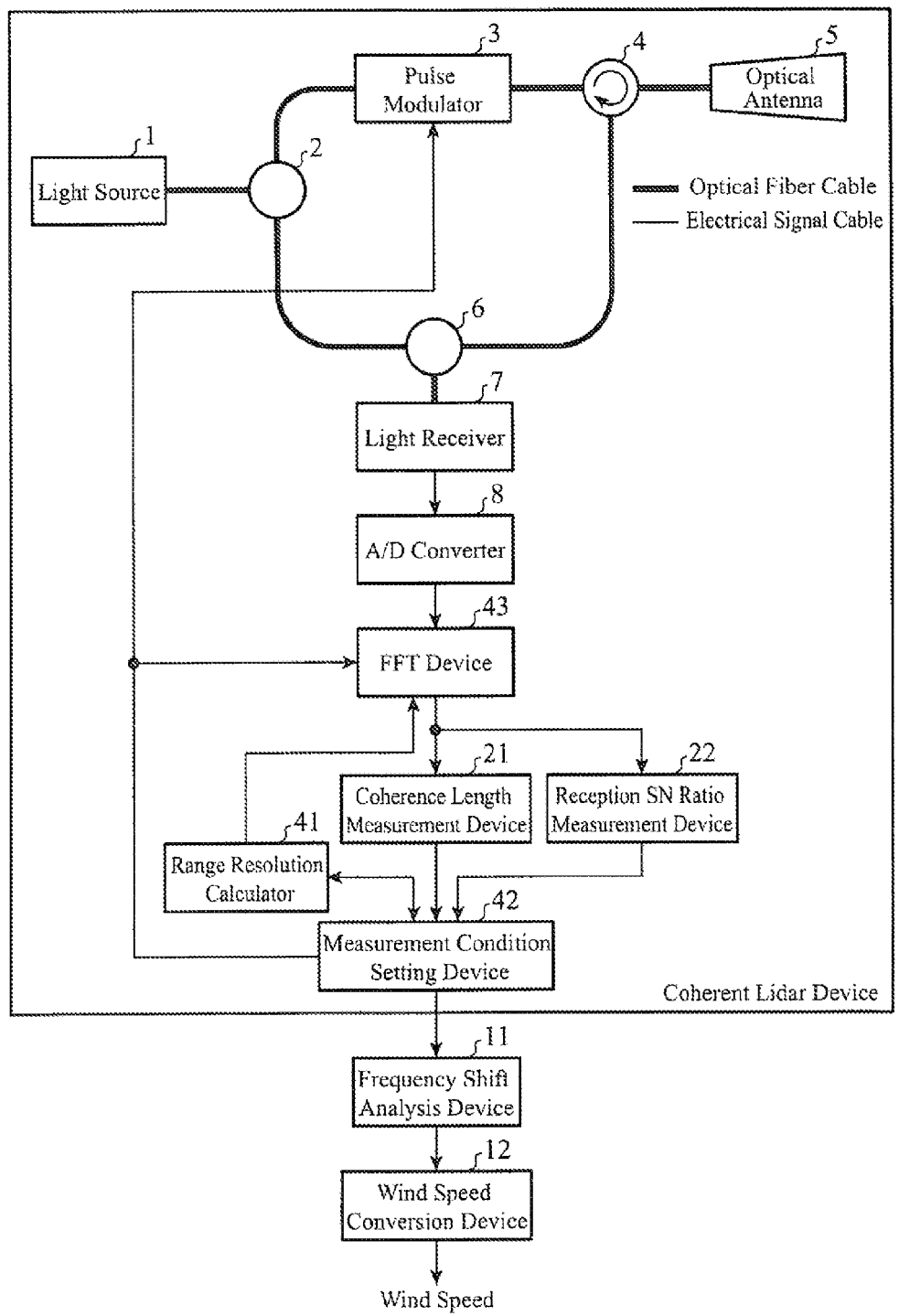
FIG. 7 is a configuration diagram depicting a laser radar device mounting a coherent lidar device thereon according to a fourth embodiment of the present invention.

FIG. 7 is a configuration diagram depicting a laser radar device mounting a coherent lidar device thereon according to a fourth embodiment of the present invention. In the figure, the same reference numerals as those in FIG. 4 denote the same or corresponding parts, and thus descriptions thereof are omitted.

A range resolution calculator 41 comprises, for example, a semiconductor integrated circuit mounting a CPU thereon, or a one-chip microcomputer, and executes the processing to calculate a range resolution ΔR based on an FFT gate width G$_w$ (or a pulse width P$_w$) with the setting changed by a measurement condition setting device 42. It is to be noted that the range resolution calculator 41 configures a range resolution calculator.

The measurement condition setting device 42 comprises, for example, a semiconductor integrated circuit mounting a CPU thereon, or a one-chip microcomputer, and performs, in case where a coherence length L$_c$ calculated by the coherence length measurement device 21 is shorter than an FFT gate width G$_w$ of an FFT device 43, a setting change to shorten the FFT gate width G$_w$ and the pulse width P$_w$ when an SNR calculated by the reception SN ratio measurement device 22 is higher than a reference SNR (a predetermined set value). When the SNR is lower than the reference SNR, the setting device performs a setting change to increase the number of integrations N (the number of times to perform incoherent integration on a received signal) for a received signal after Fourier transform (received signal in the frequency domain) to be performed when the FFT device 9 calculates the spectrum v of the received signal.

Further, in case where the range resolution ΔR calculated by the range resolution calculator 41 is lower than a range resolution ΔR$_{USER}$ designated by the user, the measurement condition setting device 42 executes the processing to change the setting of the FFT gate width G$_w$ and the pulse width P$_w$ to a width corresponding to the range resolution ΔR$_{USER}$ designated by the user (FFT gate width G$_{wUSER}$, and pulse width P$_{wUSER}$).

It is to be noted that the coherence length measurement device 21 and the measurement condition setting device 42 configure a setting changer.

The FFT device 43 comprises, for example, a semiconductor integrated circuit mounting a CPU thereon, or a one-chip microcomputer, and executes the processing to perform, in case where the range resolution ΔR calculated by the range resolution calculator 41 is higher than the range resolution ΔR$_{USER}$ designated by the user, frequency analysis on the received signal in the form of a digital signal outputted from the A/D converter 8 by a unit of the FFT gate with the width G$_w$ to calculate the spectrum v of the received signal, and further converts the spectrum v to a spectrum $v_{USER}$ in a unit of the range resolution $\Delta R_{USER}$ designated by the user and outputs the converted spectrum $v_{USER}$ to the frequency shift analysis device 11.

Meanwhile, in case where the range resolution $\Delta R$ calculated by the range resolution calculator 41 is lower than the range resolution $\Delta R_{USER}$ designated by the user, the FFT device executes the processing to perform frequency analysis on the received signal in the form of a digital signal outputted from the A/D converter 8 by a unit of the FFT gate having the width $G_{wUSER}$ with the setting changed by the measurement condition setting device 42 to calculate the spectrum $v_{USER}$ of the received signal, and output the spectrum $v_{USER}$ to the frequency shift analysis device 11.

It is to be noted that the A/D converter 8 and the FFT device 43 configure a spectrum calculator.

In the laser radar device of FIG. 7, for example, an optical line such as an optical fiber cable is used for connections between the light source 1 and the light distributor 2, between the light distributor 2 and the pulse modulator 3, between the pulse modulator 3 and the optical circulator 4, between the optical circulator 4 and the optical antenna 5, between the light distributor 2 as well as the optical circulator 4 and the optical coupler 6, and between the optical coupler 6 and the light receiver 7.

Further, an electrical line such as an electrical signal cable is used for connections between the light receiver 7 and the A/D converter 8, between the A/D converter 8 and the FFT device 43, between the FFT device 43 and the coherence length measurement device 21, the reception SN ratio measurement device 22 as well as the range resolution calculator 41, between the coherence length measurement device 21, the reception SN ratio measurement device 22 as well as the range resolution calculator 41 and the measurement condition setting device 42, between the measurement condition setting device 42 and the frequency shift analysis device 11, between the frequency shift analysis device 11 and the wind speed conversion device 12, and between the measurement condition setting device 42 and the pulse modulator 3 as well as the FFT device 43.

Figure 8:
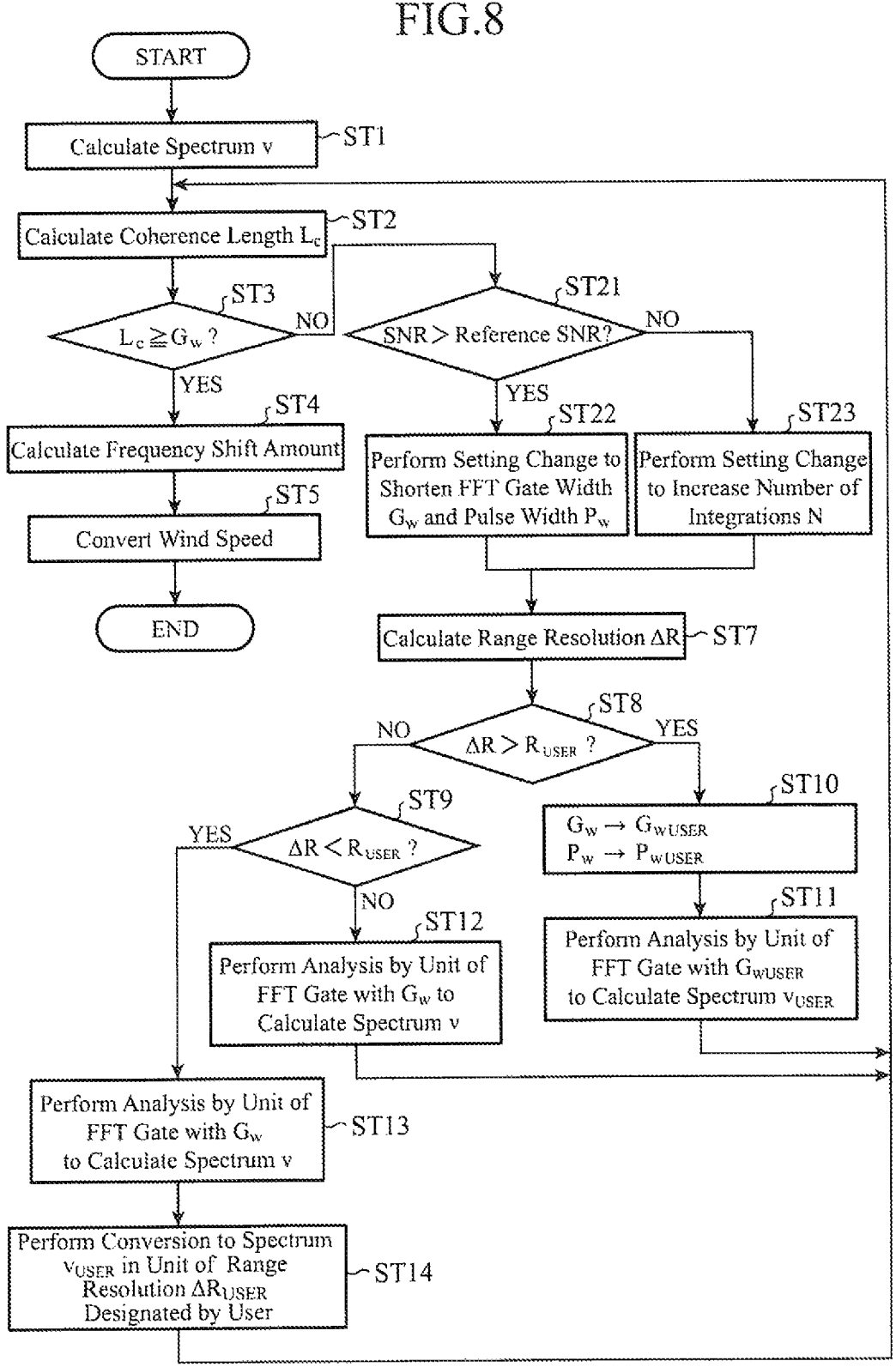
FIG. 8 is a flowchart depicting processing details of the coherent lidar device according to the fourth embodiment of the present invention.
Figure 9:
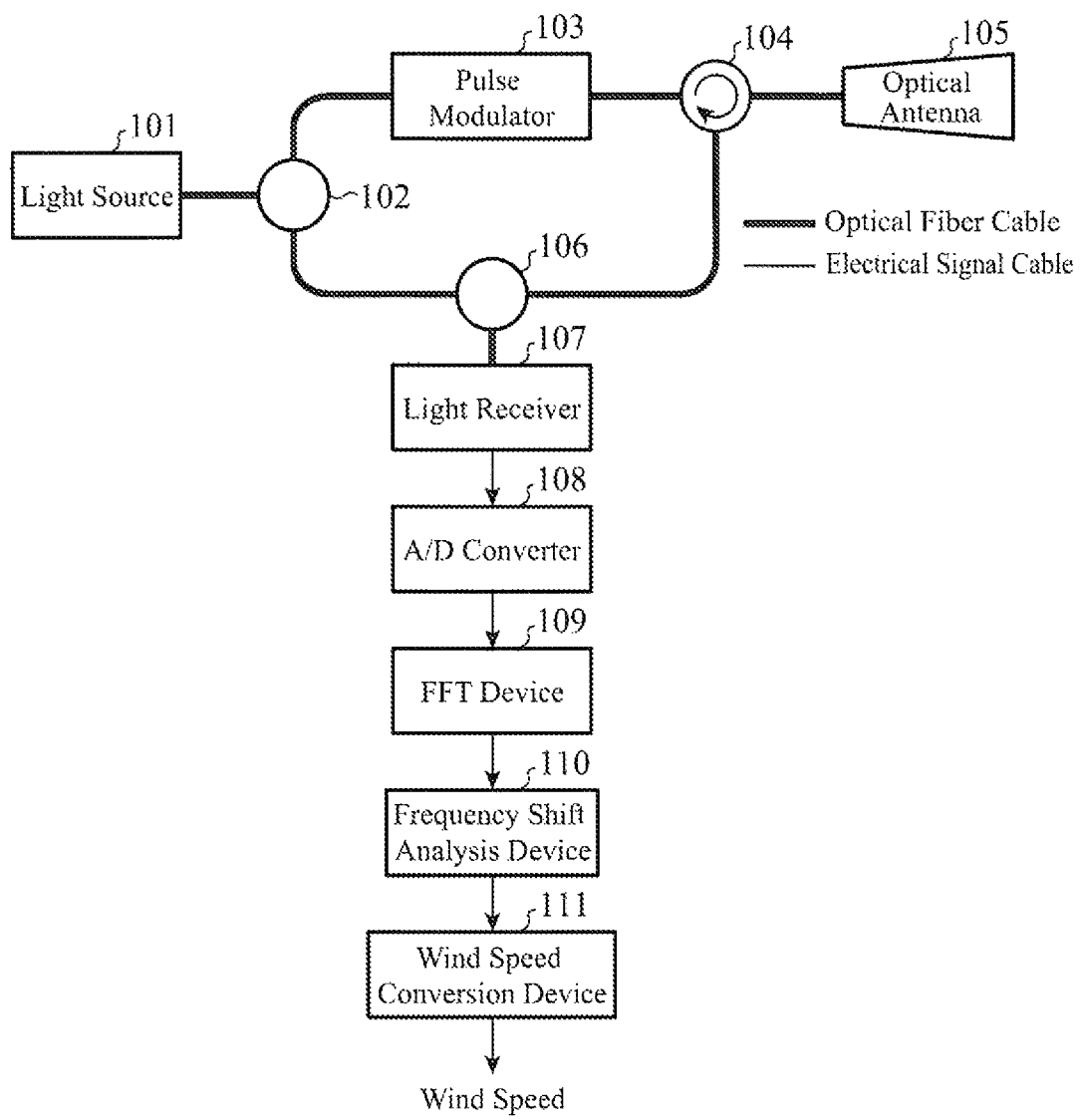
FIG. 9 is a configuration diagram depicting a typical laser radar device.

FIG. 8 is a flowchart depicting processing details of the coherent lidar device according to the fourth embodiment of the present invention.

Next, an operation is described.

It is to be noted that since the features other than the range resolution calculator 41, the measurement condition setting device 42, and the FFT device 43 are the same as those in the above second embodiment, detailed descriptions thereof are omitted.

The FFT device 43 has, like the FFT device 9 of FIG. 4, the width $G_w$ of an FFT gate set by the measurement condition setting device 42, and performs frequency analysis on the received signal in the form of the digital signal outputted from the A/D converter 8 by the unit of the FFT gate to calculate the spectrum v of the received signal (Step ST1).

More specifically, the FFT device 43 performs the Fourier transform on the received signal in the form of the digital signal outputted from the A/D converter 8 per FFT gate, and performs incoherent integration on the received signal after Fourier transform by the number of integrations N that is set in advance to calculate the spectrum v of the received signal.

When the FFT device 43 calculates the spectrum v, the coherence length measurement device 21 specifies the spectral width $\Delta v$ of the spectrum v in the same manner as in the foregoing second embodiment, and assigns the spectral width $\Delta v$ in the above Equation (1) to calculate a coherence length $L_c$ (Step ST2).

When the FFT device 43 calculates the spectrum v, for example, the reception SN ratio measurement device 22 divides, per FFT gate, the spectrum v of the received signal by the spectrum of a noise signal that is retained in advance to calculate an SNR that is a signal-to-noise ratio in the same manner as in the foregoing second embodiment.

When the coherence length measurement device 21 calculates the coherence length $L_c$ and the reception SN ratio measurement device 22 calculates the SNR, the measurement condition setting device 42 compares the coherence length $L_c$ with the FFT gate width $G_w$ of the FFT device 43, like the measurement condition setting device 23 of FIG. 4 (Step ST3).

The measurement condition setting device 42 outputs, in case where the coherence length $L_c$ is longer than the FFT gate width $G_w$ ($L_c \geq G_w$), the spectrum v calculated by the FFT device 43 to the frequency shift analysis device 11, like the measurement condition setting device 23 of FIG. 4.

Upon receiving the spectrum v calculated by the FFT device 43 from the measurement condition setting device 42, the frequency shift analysis device 11 calculates an amount of frequency shift that occurs with the movement of an aerosol in the same manner as in the second embodiment (Step ST4).

When the frequency shift analysis device 11 calculates the frequency shift amount, the wind speed conversion device 12 converts the frequency shift amount to a wind speed in a laser irradiation direction (moving speed of the aerosol) in the same manner as in the second embodiment (Step ST5).

The measurement condition setting device 42 compares, in case where the coherence length $L_c$ is shorter than the FFT gate width $G_w$ ($L_c < G_w$), the SNR calculated by the reception SN ratio measurement device 22 with the reference SNR without outputting the spectrum v calculated by the FFT device 43 to the frequency shift analysis device 11 like the measurement condition setting device 23 of FIG. 4 (Step ST21).

The measurement condition setting device 42 performs, incase where the SNR is higher than the reference SNR (SNR>reference SNR), the setting change to shorten the FFT gate width $G_w$ and the pulse width $P_w$ such that the FFT gate width $G_w$ and the pulse width $P_w$ match the coherence length $L_c$ like the measurement condition setting device 23 of FIG. 4 (Step ST22).

Meanwhile, in case where the SNR is lower than the reference SNR (SNR≤reference SNR), there is a high possibility such that a desired wind speed measurement precision cannot be achieved even if the setting of the FFT gate width $G_w$ and the pulse width $P_w$ is changed; however, the wind speed measurement precision can be enhanced by increasing the number of integrations N of the received signal after Fourier transform to be performed when the FFT device 43 calculates the spectrum v of the received signal (note: the calculation processing time becomes longer).

Hence, the measurement condition setting device 42 performs, in case where the SNR is lower than the reference SNR, the setting change to increase the number of integrations N of the received signal after Fourier transform to be performed when the FFT device 43 calculates the spectrum v of the received signal like the measurement condition setting device 23 of FIG. 4 (Step ST23).

When the measurement condition setting device 42 performs the setting change of the FFT gate width $G_w$ and the pulse width $P_w$ (or the setting change of the number of integrations N), the range resolution calculator 41 calculates the range resolution ΔR based on the FFT gate width $G_w$ following the setting change, or the pulse width $P_w$ following the setting change like the range resolution calculator 31 of FIG. 5 (Step ST7).

When the range resolution calculator 41 calculates the range resolution ΔR, the measurement condition setting device 42 compares the range resolution ΔR with the range resolution $\Delta R_{USER}$ designated by the user (Steps ST8 and ST9).

The measurement condition setting device 42 calculates, in case where the range resolution ΔR is lower than the range resolution $\Delta R_{USER}$ designated by the user ($\Delta R > \Delta R_{USER}$), the FFT gate width $G_{wUSER}$ and the pulse width $P_{wUSER}$ corresponding to the range resolution $\Delta R_{USER}$ designated by the user as represented by the above Equation (3), and changes the setting of the FFT gate width $G_w$ to the FFT gate width $G_{wUSER}$ and also changes the setting of the pulse width $P_w$ to the pulse width $P_{wUSER}$ (Step ST10).

After the setting of the FFT gate width $G_w$ and the pulse width $P_w$ is changed to the FFT gate width $G_{wUSER}$ and the pulse width $P_{wUSER}$ by the measurement condition setting device 42, upon receiving the received signal in the form of the digital signal from the A/D converter 8, the FFT device 43 performs frequency analysis on the received signal by the unit of the FFT gate having the width $G_{wUSER}$ to calculate the spectrum $v_{USER}$ of the received signal (Step ST11).

When the FFT device 43 calculates the spectrum $v_{USER}$, the coherence length measurement device 21 calculates a coherence length $L_c$ in the same manner as above.

When the coherence length $L_c$ has become longer than the FFT gate width $G_{wUSER}$ ($L_c \geq G_{wUSER}$), the measurement condition setting device 42 outputs the spectrum $v_{USER}$ calculated by the FFT device 43 to the frequency shift analysis device 11.

Meanwhile, in case where the coherence length $L_c$ is shorter than the FFT gate width $G_w$ ($L_c < G_{wUSER}$), the setting change of the FFT gate width $G_w$ and the pulse width $P_w$, or the setting change of the number of integrations N is performed again.

Upon receiving the spectrum $v_{USER}$ calculated by the FFT device 43 from the measurement condition setting device 42, the frequency shift analysis device 11 calculates an amount of frequency shift that occurs with the movement of an aerosol in the same manner as in the first embodiment (Step ST4).

When the frequency shift analysis device 11 calculates the frequency shift amount, the wind speed conversion device 12 converts the frequency shift amount to a wind speed in a laser irradiation direction (moving speed of the aerosol) in the same manner as in the first embodiment (Step ST5).

In Steps ST8 and ST9, the measurement condition setting device 42 compares the range resolution ΔR with the range resolution $\Delta R_{USER}$ designated by the user, and notifies the FFT device 43, in case where the range resolution ΔR is higher than the range resolution $\Delta R_{USER}$ designated by the user ($\Delta R < \Delta R_{USER}$) or in case where the range resolution ΔR matches the range resolution $\Delta R_{USER}$ designated by the user ($\Delta R = \Delta R_{USER}$), to that effect.

Upon receiving the notification from the measurement condition setting device 42 that the range resolution ΔR matches the range resolution $\Delta R_{USER}$ designated by the user ($\Delta R = \Delta R_{USER}$), the FFT device 43 performs frequency analysis on the received signal in the form of the digital signal outputted from the A/D converter 8 by the unit of the FFT gate having the width $G_w$ that is set by the measurement condition setting device 42 to calculate the spectrum v of the received signal (Step ST12).

When the FFT device 43 calculates the spectrum v, the coherence length measurement device 21 calculates a coherence length $L_c$ in the same manner as above.

When the coherence length $L_c$ calculated by the coherence length measurement device 21 has become longer than the FFT gate width $G_{wUSER}$ ($L_c \geq G_{wUSER}$), the measurement condition setting device 42 outputs the spectrum v calculated by the FFT device 43 to the frequency shift analysis device 11.

Meanwhile, in case where the coherence length $L_c$ is shorter than the FFT gate width $G_w$ ($L_c < G_{wUSER}$), the setting change of the FFT gate width $G_w$ and the pulse width $P_w$, or the setting change of the number of integrations N is performed again.

Upon receiving the spectrum v calculated by the FFT device 43 from the measurement condition setting device 42, the frequency shift analysis device 11 calculates the amount of frequency shift that occurs with the movement of the aerosol in the same manner as in the first embodiment (Step ST3).

When the frequency shift analysis device 11 calculates the frequency shift amount, the wind speed conversion device 12 performs the conversion to the wind speed in the laser irradiation direction (moving speed of the aerosol) based on the frequency shift amount in the same manner as in the first embodiment (Step ST4).

Upon receiving the notification from the measurement condition setting device 42 that the range resolution ΔR is higher than the range resolution $\Delta R_{USER}$ designated by the user ($\Delta R < \Delta R_{USER}$), the FFT device 43 performs frequency analysis on the received signal in the form of the digital signal outputted from the A/D converter 8 by the unit of the FFT gate with the width $G_w$ that is set by the measurement condition setting device 42 to calculate the spectrum v of the received signal (Step ST13).

Upon calculating the spectrum v of the received signal, the FFT device 43 converts the spectrum v to the spectrum $v_{USER}$ in the unit of the range resolution $\Delta R_{USER}$ designated by the user (Step ST14).

For example, the spectrum v corresponding to a plurality of FFT gates with the width $G_w$ is added thereto by an amount that falls to the FFT gate width $G_{wUSER}$ corresponding to the range resolution $\Delta R_{USER}$ designated by the user to calculate a mean value of the added values as the spectrum $v_{USER}$ in the unit of the range resolution $\Delta R_{USER}$ designated by the user.

When the FFT device 43 calculates the spectrum $v_{USER}$ in the unit of the range resolution $\Delta R_{USER}$ designated by the user, the coherence length measurement device 21 calculates the coherence length $L_c$ in the same manner as above.

When the coherence length $L_c$ calculated by the coherence length measurement device 21 has become longer than the FFT gate width $G_{wUSER}$ ($L_c \geq G_{wUSER}$), the measurement condition setting device 42 outputs the spectrum $v_{USER}$ calculated by the FFT device 43 to the frequency shift analysis device 11.

Meanwhile, in case where the coherence length $L_c$ is shorter than the FFT gate width $G_w$ ($L_c < G_{wUSER}$), the setting change of the FFT gate width $G_w$ and the pulse width $P_w$, or the setting change of the number of integrations N is performed again.

Upon receiving the spectrum $v_{USER}$ calculated by the FFT device 43 from the measurement condition setting device 42, the frequency shift analysis device 11 calculates the amount of frequency shift that occurs with the movement of the aerosol in the same manner as in the first embodiment (ST3).

When the frequency shift analysis device 11 calculates the frequency shift amount, the wind speed conversion device 12 performs the conversion to the wind speed in the laser direction (moving speed of the aerosol) based on the frequency shift amount in the same manner as in the first embodiment (ST4).

As is clear from above, according to the fourth embodiment, the wind speed is measured at a measurement precision according to the range resolution $\Delta R_{USER}$ that is designated by the user regardless of fluctuation in environmental conditions as in the above third embodiment.

Further, as in the above second embodiment, there is rendered an advantageous effect such that even when the SNR is lower than the reference SNR, the precision of measuring the wind speed can be improved.

While there is described an example according to the fourth embodiment in which the measurement condition setting device 42 shortens both the FFT gate width $G_w$ and the pulse width $P_w$, improvement in precision of measuring the wind speed can be still achieved by shortening only the FFT gate width $G_w$.

While there is described an example in which the range resolution $\Delta R_{USER}$ designated by the user is given in the fourth embodiment, a wind speed measurement precision $\Delta V_{USER}$ designated by the user or a data renewal rate $f_{USER}$ designated by the user may be given.

For example, in case where the wind speed measurement precision $\Delta V_{USER}$ designated by the user is given, the range resolution calculator 41 configuring a wind speed measurement precision calculator calculates, instead of calculating the range resolution $\Delta R$, a wind speed measurement precision $\Delta V$ based on the SNR calculated by the reception SN ratio measurement device 22 as represented by the following Equation (4):

$$\Delta V = \frac{A}{\sqrt{SNR}} \quad (4)$$

In Equation (4), A is a constant indicating the measurement sensitivity of the wind speed.

The measurement condition setting device 42 compares, instead of comparing the range resolution $\Delta R$ with the range resolution $\Delta R_{USER}$ designated by the user, the wind speed measurement precision $\Delta V$ with the wind speed measurement precision $\Delta V_{USER}$ designated by the user.

More specifically, in Step ST8, it is determined whether the wind speed measurement precision $\Delta V >$ the wind speed measurement precision $\Delta V_{USER}$ designated by the user is established or not, and in Step ST9, it is determined whether the wind speed measurement precision $\Delta V <$ the wind speed measurement precision $\Delta V_{USER}$ designated by the user is established or not.

In this manner, in case where the wind speed measurement precision $\Delta V$ is compared with the wind speed measurement precision $\Delta V_{USER}$ designated by the user, the wind speed is measurable at the wind speed measurement precision $\Delta V_{USER}$ designated by the user regardless of fluctuation in environmental conditions.

It is noted that in the present invention, a free combination in the embodiments, a modification of arbitrary components in the embodiments, or an omission of arbitrary components in the embodiments is possible within a range of the invention.

INDUSTRIAL APPLICABILITY

The coherent lidar device according to the present invention includes the setting changer that calculates the coherence length based on the spectrum of the received signal calculated by the spectrum calculator, and performs, in case where the coherence length is shorter than the width of the above range gate, a setting change to shorten the width of the range gate; it is configured such that in case where the setting change is performed by the setting changer to shorten the width, the spectrum calculator performs frequency analysis on the received signal outputted from the laser light receiver by the unit of the range gate of which the width setting is changed to calculate the spectrum of the received signal; thus, even when the coherence length is changed due to a factor such as fluctuation in environmental conditions, a higher heterodyne efficiency can be achieved; therefore, it is suitable for an application to, for example, a laser radar device.

DESCRIPTION OF REFERENCE NUMERALS and SIGNS

1 Light source (laser light radiator)
2 Light distributor (laser light radiator)
3 Pulse modulator (laser light radiator)
4 Optical circulator (laser light radiator, laser light receiver)
5 Optical antenna (laser light radiator, laser light receiver)
6 Optical coupler (laser light receiver)
7 Light receiver (laser light receiver)
8 A/D converter (spectrum calculator)
9 FFT device (spectrum calculator)
10 Coherence length measurement device (setting changer)
11 Frequency shift analysis device (frequency shift amount calculator)
12 Wind speed conversion device (speed calculator)
21 Coherence length measurement device (setting changer)
22 Reception SN ratio measurement device (signal-to-noise ratio calculator)
23 Measurement condition setting device (setting changer)
31 Range resolution calculator (range resolution calculator)
32 Coherence length measurement device (setting changer)
33 FFT device (spectrum calculator)
41 Range resolution calculator (range resolution calculator, wind speed measurement precision calculator)
42 Measurement condition setting device (setting changer)
43 FFT device (spectrum calculator)
101 Light source
102 Light distributor
103 Pulse modulator
104 Optical circulator
105 Optical antenna
106 Optical coupler
107 Light receiver
108 A/D converter
109 FFT device
110 Frequency shift analysis device
111 Wind speed conversion device.

The invention claimed is:

1. A laser radar device comprising:
a laser light radiator that radiates laser light;
a laser light receiver that receives the laser light to output a received signal of the laser light, the laser light being radiated in the atmosphere from the laser light radiator and reflected by a measurement target existing in the atmosphere to be returned;

a spectrum calculator that performs frequency analysis on a received signal outputted from the laser light receiver by a unit of a range gate to calculate a spectrum of the received signal; and a setting changer that calculates a coherence length based on a spectrum of the received signal calculated by the spectrum calculator, and performs a setting change to shorten a width of the range gate in case where the coherence length is shorter than the width of the range gate, wherein in case where the setting change to shorten the width is performed by the setting changer, the spectrum calculator performs frequency analysis on the received signal outputted from the laser light receiver by the unit of the range gate with the width after the setting change to calculate the spectrum of the received signal.

2. The laser radar device according to claim 1, further comprising:

a signal-to-noise ratio calculator that calculates a signal-to-noise ratio based on the spectrum of the received signal calculated by the spectrum calculator, wherein in case where the coherence length is shorter than the width of the range gate, the setting changer performs a setting change to shorten the width of the range gate when the signal-to-noise-ratio calculated by the signal-to-noise ratio calculator is higher than a predetermined set value, and performs, when the signal-to-noise-ratio is lower than the predetermined set value, a setting change to increase the number of integrations of a received signal in a frequency domain to be performed when the spectrum calculator calculates the spectrum.

3. The laser radar device according to claim 1, wherein the setting changer performs a setting change to shorten a pulse width of the laser light to be radiated in the atmosphere from the laser radar device in shortening the width of the range gate.

4. The laser radar device according to claim 3, wherein the setting changer performs a setting change to match the width of the range gate and the pulse width to the coherence length.

5. The laser radar device according to claim 1, further comprising:

a frequency shift amount calculator that calculates an amount of frequency shift occurring with a movement of the measurement target based on the spectrum of the received signal calculated by the spectrum calculator; and a speed calculator that calculates a moving speed of the measurement target based on the frequency shift amount calculated by the frequency shift amount calculator, wherein in case where the setting change to shorten the width is performed by the setting changer, the spectrum calculator performs frequency analysis on the received signal outputted from the laser light receiver by the unit of the range gate with the width after the setting change to calculate the spectrum of the received signal.

6. The laser radar device according to claim 1, further comprising:

a range resolution calculator that calculates a range resolution based on the width of the range gate after the setting change by the setting changer, wherein in case where the range resolution calculated by the range resolution calculator is higher than a range resolution designated by a user, the spectrum calculator performs frequency analysis on the received signal outputted from the laser light receiver by the unit of the range gate with the width after the setting change by the setting changer to calculate the spectrum of the received signal, and also converts the spectrum to a spectrum in a unit of the range resolution designated by the user and outputs the converted spectrum to the frequency shift amount calculator, and in case where the range resolution calculated by the range resolution calculator is lower than the range resolution designated by the user, the setting changer performs a setting change of the width of the range gate to a width corresponding to the range resolution designated by the user, and the spectrum calculator performs frequency analysis on the received signal outputted from the laser light receiver by the unit of the range gate with the width after the setting change by the setting changer to calculate the spectrum of the received signal, and outputs the spectrum to the frequency shift amount calculator.

7. The laser radar device according to claim 1, further comprising:

a wind speed measurement precision calculator that calculates a wind measurement precision based on the signal-to-noise ratio calculated by the signal-to-noise ratio calculator, wherein in case where the wind speed measurement precision calculated by the wind speed measurement precision calculator is higher than a wind speed measurement precision designated by the user, the spectrum calculator performs frequency analysis on the received signal outputted from the laser light receiver by the unit of the range gate with the width after the setting change by the setting changer to calculate the spectrum of the received signal, and converts the spectrum to a spectrum in a unit of a range resolution designated by the user, and outputs the converted spectrum to the frequency shift amount calculator, in case where the wind speed measurement precision calculated by the wind speed measurement precision calculator is lower than the wind speed measurement precision designated by the user, the setting changer performs a setting change to match the width of the range gate to a width corresponding to the range resolution designated by the user, and the spectrum calculator performs frequency analysis on the received signal outputted from the laser light receiver by the unit of the range gate with width after the setting change by the setting changer to calculate the spectrum of the received signal, and outputs the spectrum to the frequency shift amount calculator.

* * * * *